US012724537B2

(12) United States Patent
Lee et al.

(10) Patent No.: US 12,724,537 B2
(45) Date of Patent: Sep. 1, 2026

(54) STORAGE DEVICES CALCULATING A WORDLINE GAP VALUE, AND METHODS OF OPERATING THE SAME

(71) Applicant: Samsung Electronics Co., Ltd., Suwon-si (KR)

(72) Inventors: Jinyoung Lee, Suwon-si (KR); Woohyun Kang, Suwon-si (KR); Youngjoo Seo, Suwon-si (KR); Hyunkyo Oh, Suwon-si (KR); Heewon Lee, Suwon-si (KR); Donghoo Lim, Suwon-si (KR); Jin Gu Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 41 days.

(21) Appl. No.: 18/127,133

(22) Filed: Mar. 28, 2023

(65) Prior Publication Data

US 2024/0078018 A1 Mar. 7, 2024

(30) Foreign Application Priority Data

Sep. 7, 2022 (KR) ........................ 10-2022-0113721

(51) Int. Cl.
*G06F 3/06* (2006.01)

(52) U.S. Cl.
CPC .......... *G06F 3/0614* (2013.01); *G06F 3/0653* (2013.01); *G06F 3/0659* (2013.01); *G06F 3/0679* (2013.01)

(58) Field of Classification Search
CPC .... G06F 3/0614; G06F 3/0653; G06F 3/0659; G06F 3/0679; G06F 3/0658;
(Continued)

(56) References Cited

U.S. PATENT DOCUMENTS 9,117,536 B2 8/2015 Yoon et al.
9,330,775 B2 5/2016 Kim et al.
(Continued)

FOREIGN PATENT DOCUMENTS

KR 20140013402 A 2/2014
KR 20140026758 A 3/2014
KR 20200055976 A 5/2020

*Primary Examiner* — Rocio Del Mar Perez-Velez
*Assistant Examiner* — Jonah C Krieger
(74) *Attorney, Agent, or Firm* — Wolf, Greenfield & Sacks, P.C.

(57) ABSTRACT

Disclosed is a method of operating a storage device which includes a storage controller and a non-volatile memory device. The method includes providing a first request indicating a word line sequential read operation of a target memory block of the non-volatile memory device, providing first word line read data corresponding to memory cells of a first word line of the target memory block based on the first request, providing second word line read data corresponding to memory cells of a second word line of the target memory block based on the first request, the second word line being adjacent to the first word line, calculating a first word line gap value based on the first word line read data and the second word line read data, and performing a first reliability operation of the target memory block based on the first word line gap value.

17 Claims, 20 Drawing Sheets

(58) Field of Classification Search
CPC . G11C 11/5642; G11C 16/26; G11C 16/3418; G11C 16/349; G11C 16/3431; G11C 16/0483; G11C 16/08; G11C 16/14; G11C 16/30; G11C 16/34; G11C 16/3404
See application file for complete search history.

(56) References Cited

U.S. PATENT DOCUMENTS

| | | | | |
|---|---|---|---|---|
| 9,558,816 | B2 | 1/2017 | Han et al. | |
| 9,685,206 | B2 * | 6/2017 | Choi | G11C 16/26 |
| 9,728,279 | B2 | 8/2017 | Yim et al. | |
| 11,342,033 | B1 | 5/2022 | Song et al. | |
| 2014/0056073 | A1 * | 2/2014 | Um | G11C 16/26 365/185.12 |
| 2020/0152279 | A1 * | 5/2020 | Oh | G11C 16/16 |
| 2023/0266901 | A1 * | 8/2023 | Khayat | G11C 29/021 |
| 2023/0307054 | A1 * | 9/2023 | Manwani | G11C 16/0483 |
| 2023/0345711 | A1 * | 10/2023 | Liu | H10B 12/482 |
| 2023/0393759 | A1 * | 12/2023 | Jeong | G11C 29/50004 |

* cited by examiner

Figure 2:
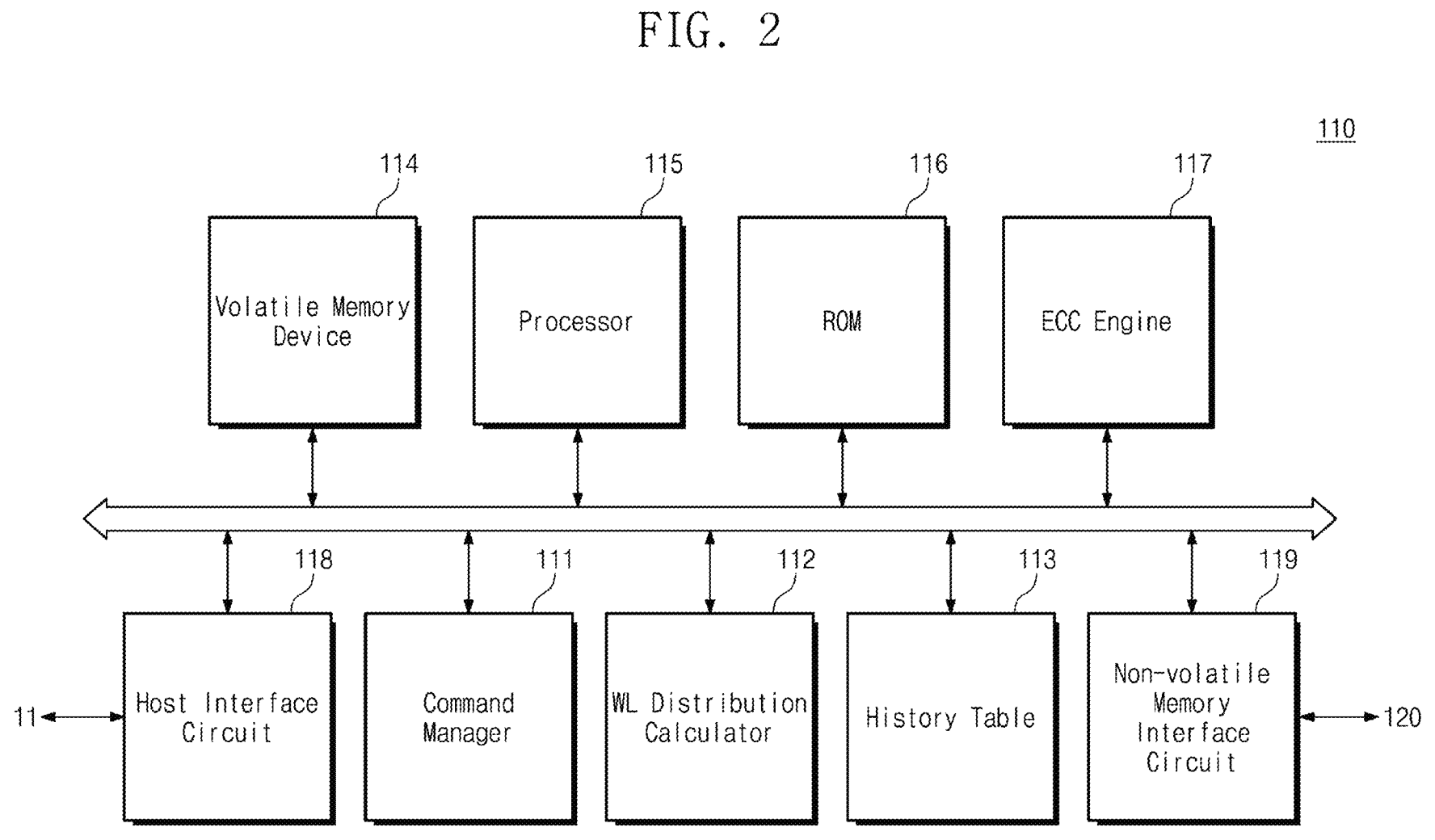

117 ECC Engine

116 ROM

115 Processor

114 Volatile Memory Device

119 Non-volatile Memory Interface Circuit

120

113 History Table

112 WL Distribution Calculator

111 Command Manager

118 Host Interface Circuit

11

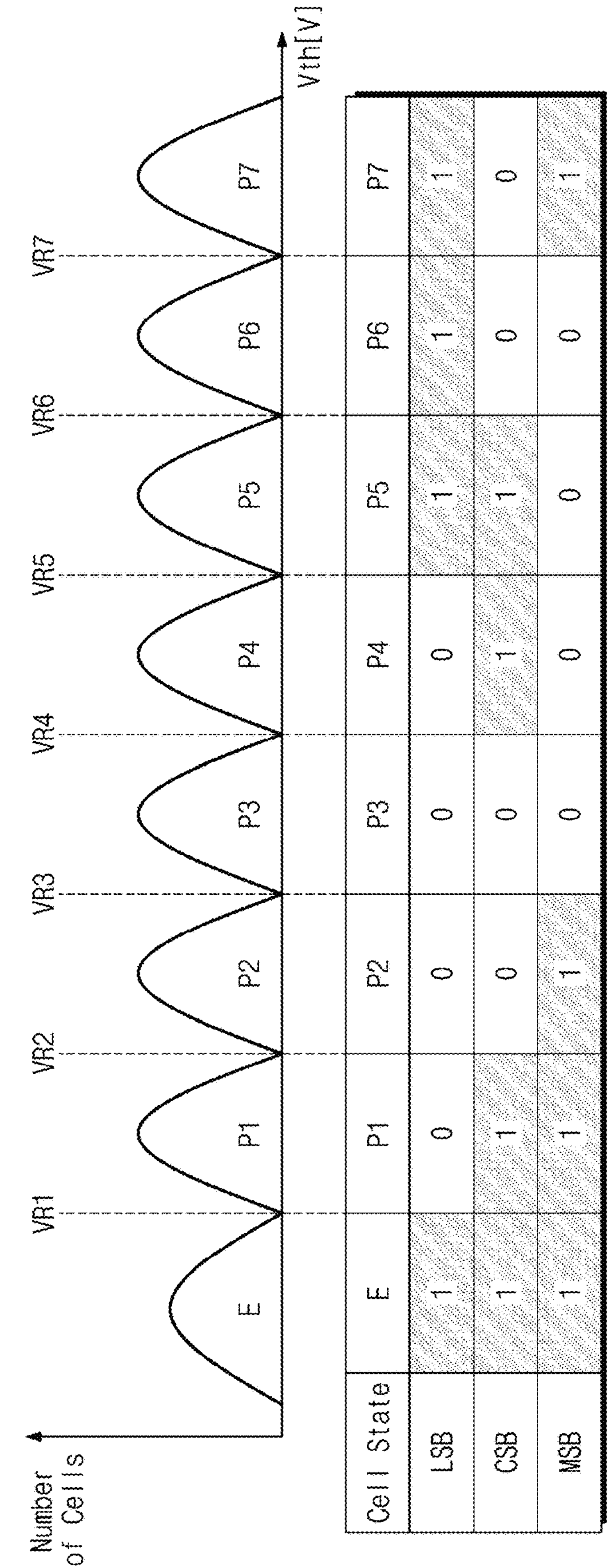
| Cell State | E | P1 | P2 | P3 | P4 | P5 | P6 | P7 |
|---|---|---|---|---|---|---|---|---|
| LSB | 1 | 0 | 0 | 0 | 0 | 1 | 1 | 1 |
| CSB | 1 | 1 | 0 | 0 | 1 | 1 | 0 | 0 |
| MSB | 1 | 1 | 1 | 0 | 0 | 0 | 0 | 1 |

FIG. 5C

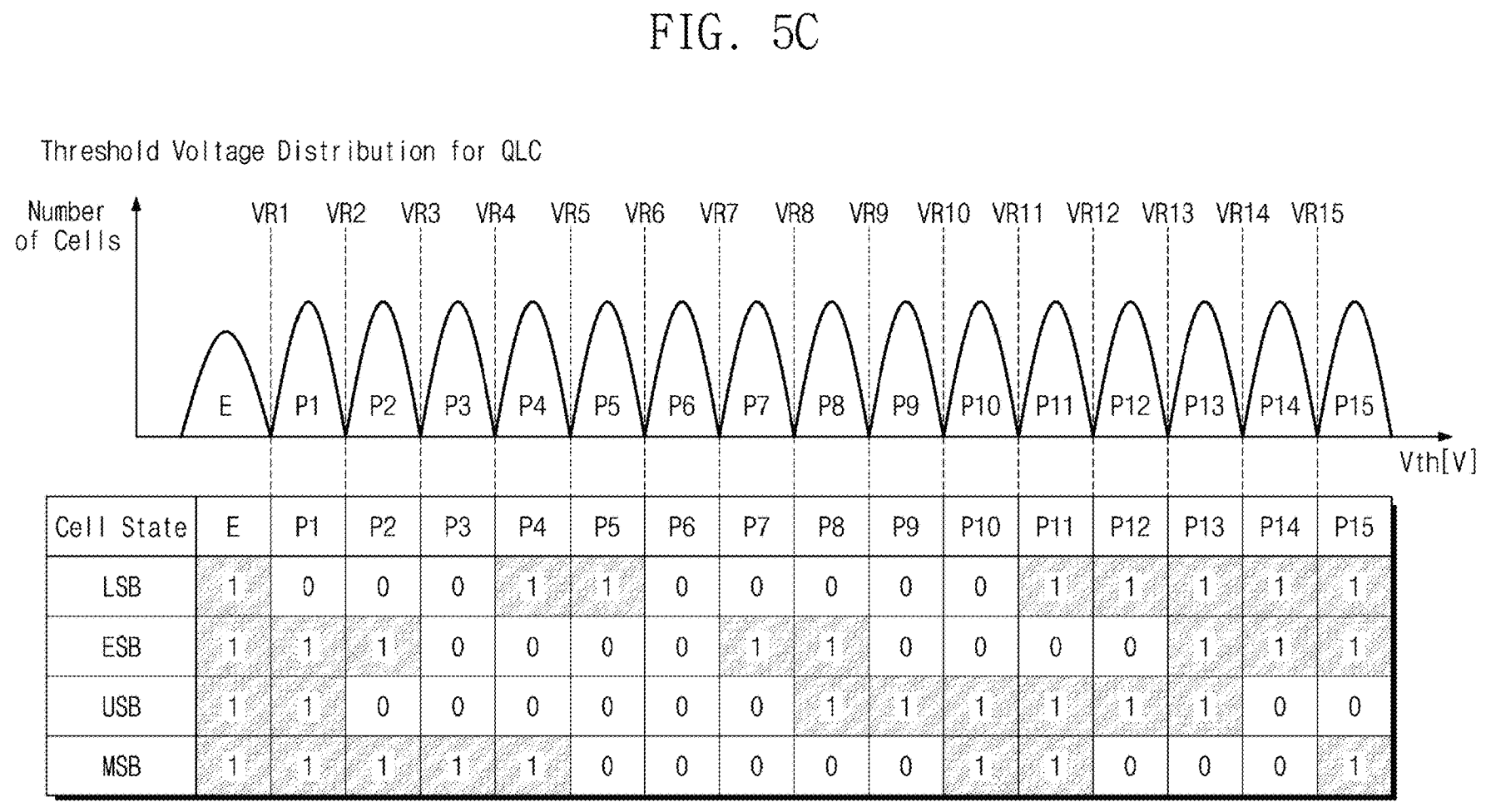

| Cell State | E | P1 | P2 | P3 | P4 | P5 | P6 | P7 | P8 | P9 | P10 | P11 | P12 | P13 | P14 | P15 |
|---|---|---|---|---|---|---|---|---|---|---|---|---|---|---|---|---|
| LSB | 1 | 0 | 0 | 0 | 1 | 1 | 0 | 0 | 0 | 0 | 0 | 1 | 1 | 1 | 1 | 1 |
| ESB | 1 | 1 | 1 | 0 | 0 | 0 | 0 | 1 | 1 | 0 | 0 | 0 | 0 | 1 | 1 | 1 |
| USB | 1 | 1 | 0 | 0 | 0 | 0 | 0 | 0 | 1 | 1 | 1 | 1 | 1 | 1 | 0 | 0 |
| MSB | 1 | 1 | 1 | 1 | 1 | 0 | 0 | 0 | 0 | 0 | 1 | 1 | 0 | 0 | 0 | 1 |

FIG. 6

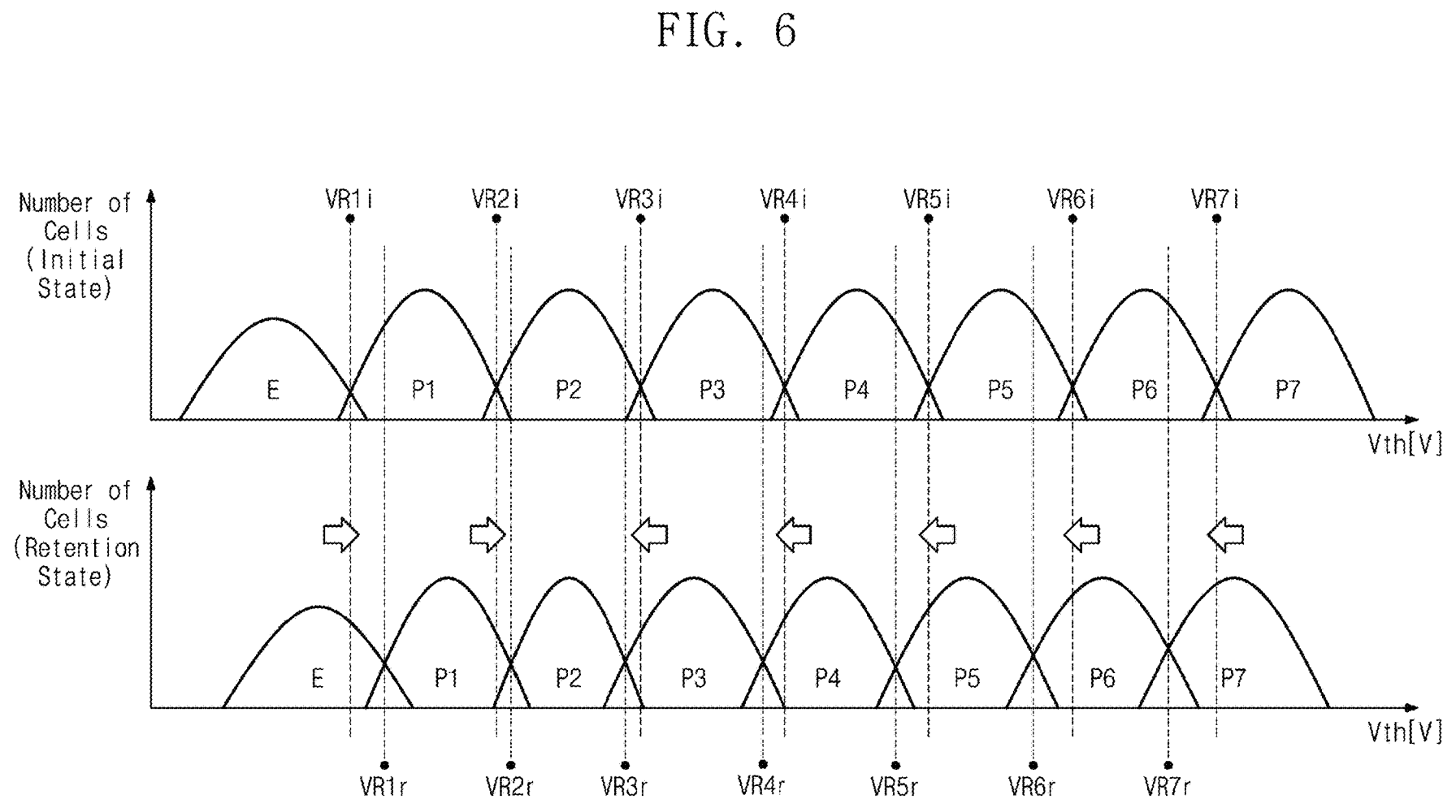

Number of Cells (Initial State)

Vth[V]

E P1 P2 P3 P4 P5 P6 P7

VR1i VR2i VR3i VR4i VR5i VR6i VR7i

Number of Cells (Retention State)

Vth[V]

Figure 7:
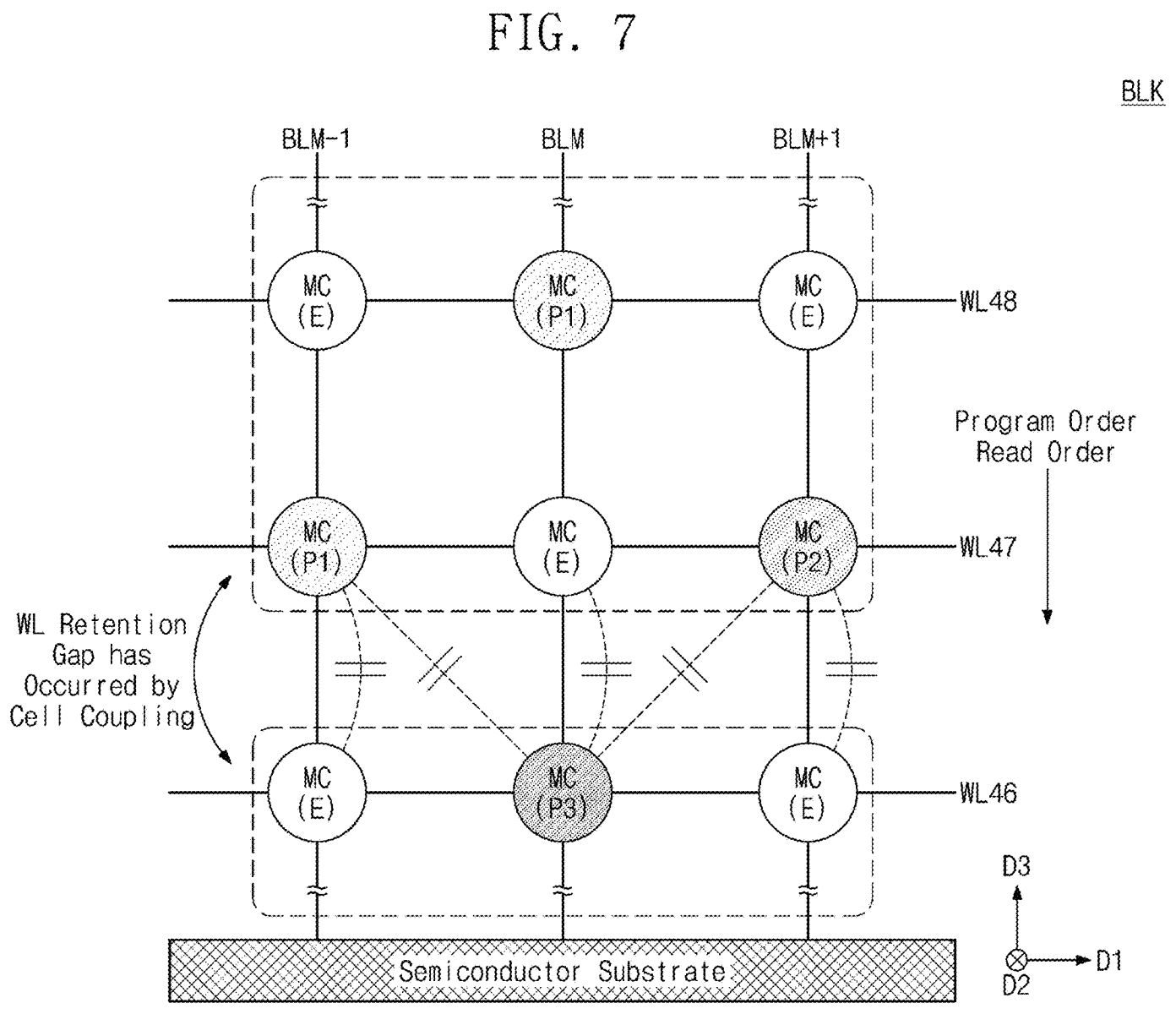

BLK

BLM-1
BLM
BLM+1
WL48
WL47
WL46
MC (E)
MC (P1)
MC (E)
MC (P1)
MC (E)
MC (P2)
MC (E)
MC (P3)
MC (E)
Program Order
Read Order
D3
D2
D1
Semiconductor Substrate
WL Retention Gap has Occurred by Cell Coupling

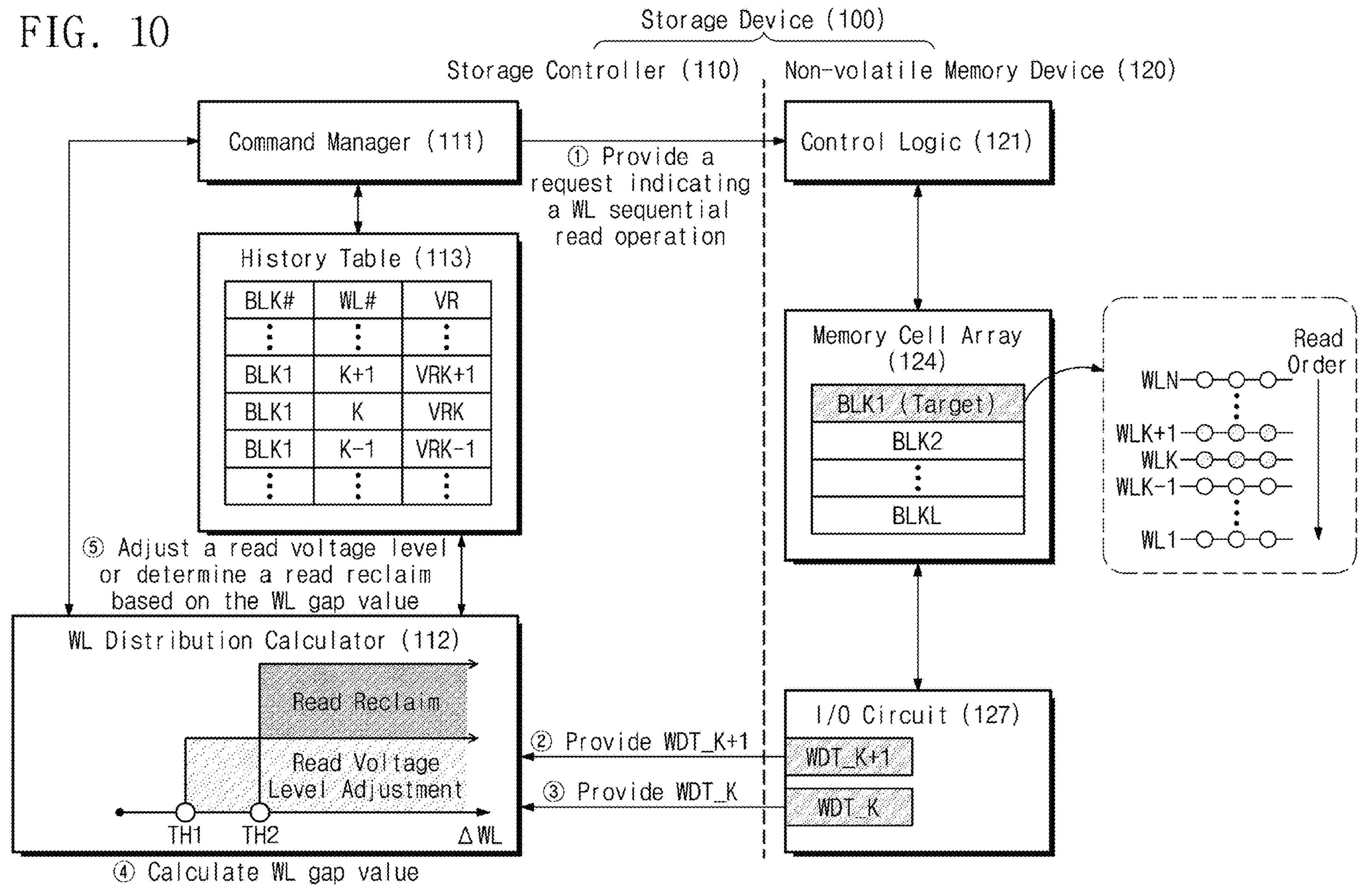

FIG. 10
Storage Device (100)
Storage Controller (110)
Non-volatile Memory Device (120)
Command Manager (111)
① Provide a request indicating a WL sequential read operation
Control Logic (121)
History Table (113)
BLK#
WL#
VR
BLK1
K+1
VRK+1
BLK1
K
VRK
BLK1
K-1
VRK-1
Memory Cell Array (124)
BLK1 (Target)
BLK2
BLKL
Read Order
WLN
WLK+1
WLK
WLK-1
WL1
⑤ Adjust a read voltage level or determine a read reclaim based on the WL gap value
WL Distribution Calculator (112)
Read Reclaim
Read Voltage Level Adjustment
TH1
TH2
ΔWL
④ Calculate WL gap value
I/O Circuit (127)
② Provide WDT_K+1
③ Provide WDT_K
WDT_K+1
WDT_K

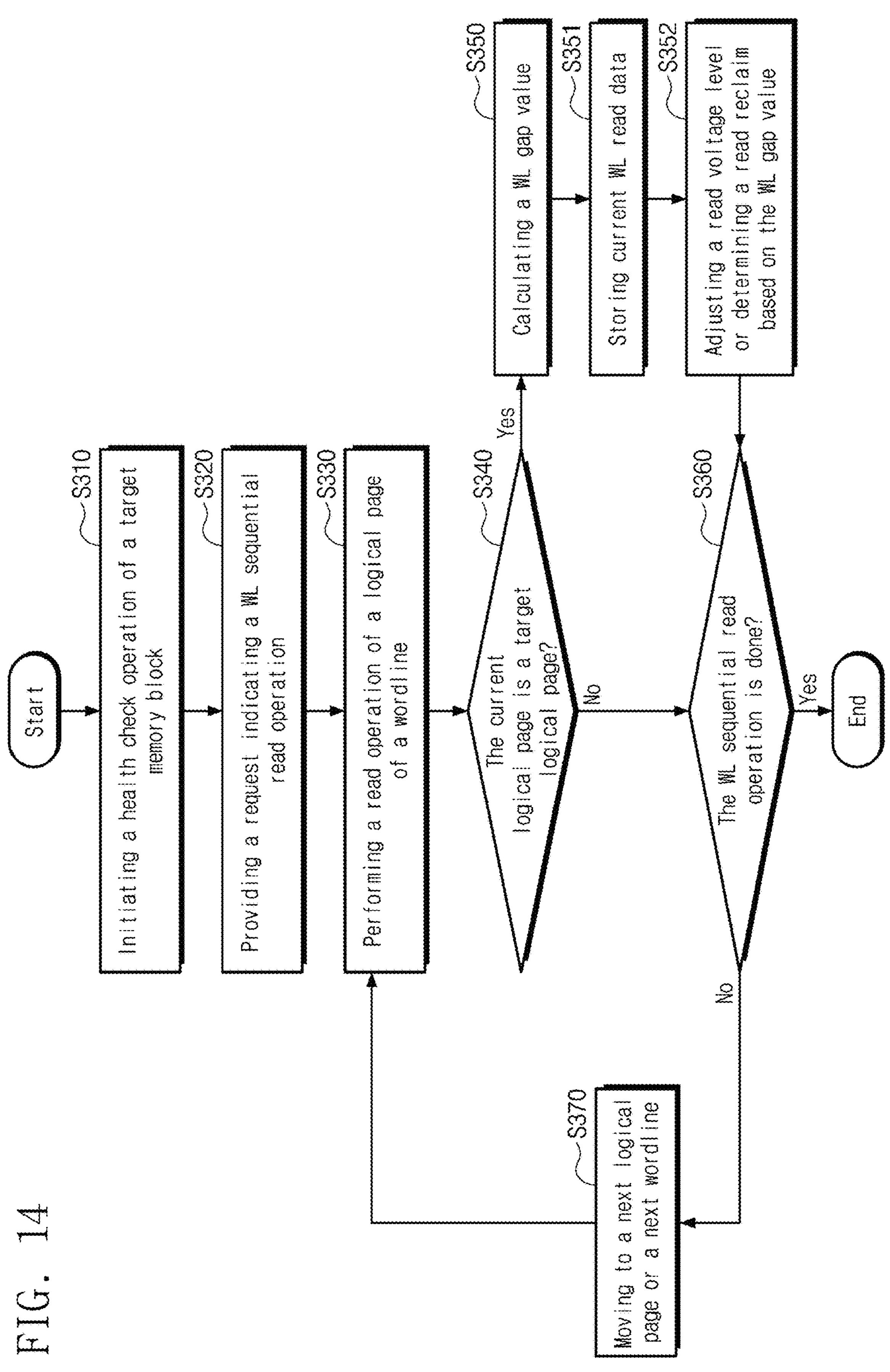
FIG. 14
Start
Initiating a health check operation of a target memory block
S310
Providing a request indicating a WL sequential read operation
S320
Performing a read operation of a logical page of a wordline
S330
The current logical page is a target logical page?
S340
Yes
No
Calculating a WL gap value
S350
Storing current WL read data
S351
Adjusting a read voltage level or determining a read reclaim based on the WL gap value
S352
The WL sequential read operation is done?
S360
Yes
No
End
Moving to a next logical page or a next wordline
S370

STORAGE DEVICES CALCULATING A WORDLINE GAP VALUE, AND METHODS OF OPERATING THE SAME

CROSS-REFERENCE TO RELATED APPLICATIONS

This application claims priority under 35 U.S.C. § 119 to Korean Patent Application No. 10-2022-0113721 filed on Sep. 7, 2022, in the Korean Intellectual Property Office, the disclosures of which are incorporated by reference herein in their entireties.

BACKGROUND

Embodiments of the present disclosure described herein relate to storage devices, and more particularly, relate to storage devices calculating a word line gap value and methods of operating the same.

A memory device can store data in response to a write request and can output data stored therein in response to a read request. For example, a memory device that loses data stored therein when a power supply is interrupted, such as a dynamic random access memory (DRAM) device or a static RAM (SRAM) device, is classified as a volatile memory device. A memory device that retains data stored therein even when a power supply is interrupted, such as a flash memory device, a phase-change RAM (PRAM), a magnetic RAM (MRAM), or a resistive RAM (RRAM), is classified as a non-volatile memory device.

As memory cells of the non-volatile memory device are programmed based on data bit values, the memory cells may form a threshold voltage distribution corresponding to the data bit values. The threshold voltage distribution may change due to various factors such as retention, read disturb, and hot-carrier injection (HCl). Nowadays, due to the high integration and high capacity of semiconductor chips, or due to the change of a storage management policy, the number of memory cells in one memory block may increase, and a time taken to program one memory block may increase. As such, distribution characteristics of word lines included in the same memory block may be different from each other, which may reduce the reliability of the non-volatile memory device.

SUMMARY

Aspects of the present disclosure provide storage devices calculating a word line gap value and methods of operating the same.

According to some embodiments, a method of operating a storage device which includes a storage controller and a non-volatile memory device includes providing, by the storage controller, a first request indicating a word line sequential read operation of a target memory block of the non-volatile memory device, providing, to the storage controller from the non-volatile memory device, first word line read data corresponding to memory cells of a first word line of the target memory block based on the first request, providing, to the storage controller from the non-volatile memory device, second word line read data corresponding to memory cells of a second word line of the target memory block based on the first request, the second word line being adjacent to the first word line, calculating, by the storage controller, a first word line gap value based on the first word line read data and the second word line read data, and performing, by the storage controller, a first reliability operation of the target memory block based on the first word line gap value.

According to some embodiments, a method of operating a storage device which includes a storage controller and a non-volatile memory device includes providing, by the storage controller, a first request indicating a word line sequential read operation of a target memory block of the non-volatile memory device, generating, by the non-volatile memory device, first word line read data corresponding to memory cells of a first word line of the target memory block based on the first request, generating, by the non-volatile memory device, second word line read data corresponding to memory cells of a second word line of the target memory block based on the first request, the second word line being adjacent to the first word line, calculating, by the non-volatile memory device, a word line gap value based on the first word line read data and the second word line read data, and performing, by the non-volatile memory device, a reliability operation of the target memory block based on the word line gap value.

According to some embodiments, a storage device includes a non-volatile memory device that includes a target memory block having a plurality of word lines, and a storage controller configured to generate a first request that indicates a word line sequential read operation of the target memory block. Based on the first request, the non-volatile memory device is configured to generate first word line read data and second word line read data, the first word line read data corresponding to memory cells of a first word line from the plurality of word lines, and the second word line read data corresponding to memory cells of a second word line adjacent to the first word line from the plurality of word lines. One of the non-volatile memory device or the storage controller is configured to calculate a word line gap value based on the first word line read data and the second word line read data and perform a reliability operation of the target memory block based on the word line gap value.

BRIEF DESCRIPTION OF THE DRAWINGS

The above and other objects and features of the present disclosure will become apparent by describing in detail example embodiments thereof with reference to the accompanying drawings.

FIG. 2 is a block diagram illustrating a storage controller of FIG. 1 in detail, according to some embodiments of the present disclosure.

FIG. 5B is a diagram illustrating threshold voltage distributions of triple level cells according to some embodiments of the present disclosure.

FIG. 5C is a diagram illustrating threshold voltage distributions for quadruple level cells, according to some embodiments of the present disclosure.

FIG. 6 is a diagram describing a change of threshold voltage distributions according to some embodiments of the present disclosure.

FIG. 7 is a diagram describing word lines of a memory block according to some embodiments of the present disclosure.

FIG. 10 is a diagram describing a method of operating a storage device according to some embodiments of the present disclosure.

FIG. 14 is a flowchart describing a method of operating a storage device according to some embodiments of the present disclosure.

DETAILED DESCRIPTION

Below, storage devices and methods of operating the same according to example embodiments of the present disclosure will be described in detail with reference to the accompanying drawings.

Figure 1:
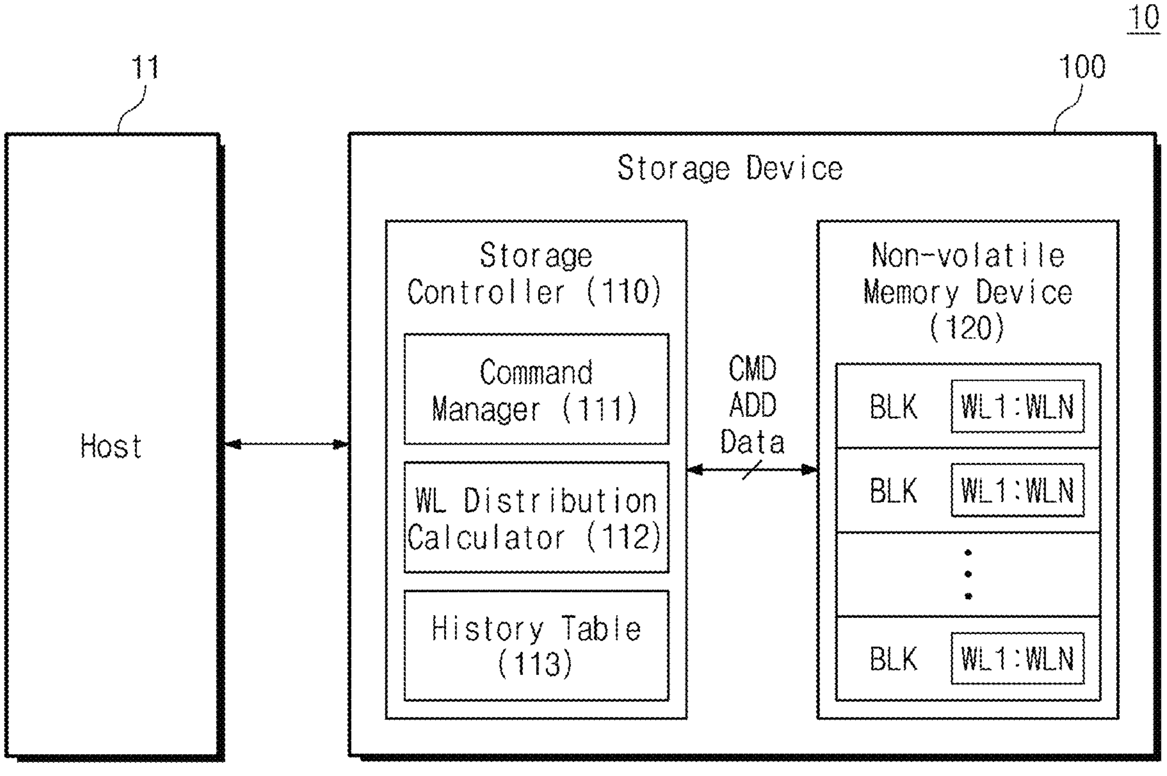
FIG. 1 is a block diagram of a storage system according to some embodiments of the present disclosure.

FIG. 1 is a block diagram of a storage system according to some embodiments of the present disclosure. Referring to FIG. 1, a storage system 10 may include a host 11 and a storage device 100. In some embodiments, the storage system 10 may refer to a computing system, which is configured to process a variety of information, such as a personal computer (PC), a notebook, a laptop, a server, a workstation, a tablet PC, a smartphone, a digital camera, and a black box.

The host 11 may control an overall operation of the storage system 10. For example, the host 11 may store data (e.g., may write data) in the storage device 100 or may read data stored in the storage device 100.

The storage device 100 may include a storage controller 110 and a non-volatile memory device 120. The non-volatile memory device 120 may store data. The storage controller 110 may store data (e.g., may write data) in the non-volatile memory device 120 or may read data stored in the non-volatile memory device 120. The non-volatile memory device 120 may operate under control of the storage controller 110. For example, based on a command CMD indicating an operation and an address ADD indicating a location of data, the storage controller 110 may store the data in the non-volatile memory device 120 or may read the data stored in the non-volatile memory device 120.

The non-volatile memory device 120 may include a plurality of memory blocks BLK. Each of the plurality of memory blocks BLK may include a plurality of word lines WL1 to WLN. For example, one memory block BLK may include first to N-th word lines WL1 to WLN. Herein, "N" is an arbitrary natural number (e.g., a whole number greater than or equal to 1). Each of the first to N-th word lines WL1 to WLN may be connected with a plurality of memory cells. Each of the plurality of memory cells may store data.

In some embodiments, the non-volatile memory device 120 may be a NAND flash memory device, but the present disclosure is not limited thereto. For example, the non-volatile memory device 120 may be one of various storage devices, which retain data stored therein even though a power supply is turned off, such as a phase-change random access memory (PRAM), a magnetic random access memory (MRAM), a resistive random access memory (RRAM), and a ferroelectric random access memory (FRAM).

The storage controller 110 may include a command manager 111, a word line distribution calculator 112, and a history table 113.

The command manager 111 may manage various commands indicating operations to be performed in the non-volatile memory device 120. For example, the command manager 111 may provide the non-volatile memory device 120 with various commands such as a read command, a write command, and an erase command.

The command manager 111 may manage commands guaranteeing the reliability of the non-volatile memory device 120. For example, the command manager 111 may manage a command indicating a word line sequential read operation for generating word line read data.

The word line read data may be managed in units of word line (e.g., in word line sized units). The word line read data may indicate the number of memory cells, which are determined based on a target read voltage level as having a first bit value (e.g., "1"), from among memory cells of a specific word line. The word line read data may be also referred to as a "cell count value" or an "on-cell count value". The word line sequential read operation may indicate an operation in which memory cells of word lines physically adjacent within the same memory block are sequentially read in units of word line.

For another example, the command manager 111 may manage commands for read retry and read reclaim, based on distribution information obtained from the non-volatile memory device 120.

The read retry may refer to an operation of changing a read voltage level and again performing the read operation. For example, when an error of the read data is uncorrectable, the storage controller 110 may again perform the read operation by using an optimized read voltage level.

The read reclaim may refer to an operation of again writing data stored in the memory cells of the non-volatile memory device 120 in any other memory cells for the purpose of guaranteeing the reliability of data. For example, the storage controller 110 may perform the read operation on target data of a first memory block determined as the read reclaim is required, may perform the write operation for writing the target data in a second memory block, and may perform the erase operation on the first memory block. In this case, the read operation may be based on the optimized read voltage level.

The word line distribution calculator 112 may calculate a word line gap value and may perform a reliability operation. For example, the memory blocks of the non-volatile memory device 120 may include the plurality of word lines. Among the plurality of word lines, a first word line and a second word line may be adjacent to each other. The word line gap value may be determined based on first word line read data corresponding to the memory cells of the first word line and second word line read data corresponding to the memory cells of the second word line.

The reliability operation may refer to preventative operations or restorative operations for suppressing the reduction of reliability due to the change of the threshold voltage distribution of memory cells. The threshold voltage distribution may change due to various factors such as retention, read disturb, and hot-carrier injection (HCl). Nowadays, due to the high integration and high capacity of semiconductor chips, or due to the change of a storage management policy (e.g., according to the zoned name space (ZNS) standard, a memory block being managed for a long time in an open state), the number of memory cells in one memory block may increase, and a time taken to program one memory block may increase. As such, distribution characteristics of word lines included in the same memory block may be different from each other.

The reliability operation may consider a difference between distribution characteristics (or tendencies) of word lines. The reliability operation may include adjusting a target read voltage level in units of word line. The reliability operation may include determining whether the read reclaim of the target memory block is required, based on the word line read data obtained in units of word line. The target memory block may refer to a memory block targeted for the reliability operation from among a plurality of memory blocks.

The history table 113 may manage read voltage levels of the plurality of word lines in the memory block. The word line distribution calculator 112 may adjust the read voltage levels by updating the read voltage levels of the history table 113 based on the word line gap value. The updated read voltage levels may be used for following a normal read operation (e.g., the read operation according to the request of the host 11) or for the read operation for the read reclaim.

The history table 113 may manage the read voltage levels in units of word line. For example, the first word line and the second word line may be included in the same memory block. The word line distribution calculator 112 may calculate the word line gap value based on the first word line read data corresponding to the memory cells of the first word line and the second word line read data corresponding to the memory cells of the second word line. When the word line gap value of the first and second word lines exceeds a first threshold value, the word line distribution calculator 112 may update read voltage levels of a third word line in the history table 113. The third word line may be adjacent to the second word line. The first threshold value may be used to determine whether to adjust the read voltage levels of the third word line.

An uncorrectable error of data that is/are read in following the normal read operation may decrease by optimizing the read voltage level for each word line. As such, the number of times of the read retry operation may decrease, the internal I/O load of the storage device 100 may decrease, and a read operation speed of the storage device 100 may be improved.

Also, a threshold voltage distribution for each word line (and not for each memory block) is considered, which may accurately determine whether the memory block is degraded and whether the read reclaim is required, and may improve the reliability of the storage device 100.

For better understanding of the present disclosure, an example in which the word line distribution calculator 112 of the storage controller 110 calculates the word line gap value and performs the reliability operation is described, but the present disclosure is not limited thereto. In some embodiments, the non-volatile memory device 120 may calculate the word line gap value and may perform the reliability operation. This will be described in detail with reference to FIGS. 13, 14, and 15.

As described above, according to example embodiments of the present disclosure, a storage device may calculate a word line gap value and may perform the reliability operation based on the word line gap value. As the storage device analyzes a threshold voltage distribution for each word line, and not for each memory block, the storage device may optimize the read voltage level in units of word line, may decrease the number of times of the read retry operation, and may accurately determine whether the read reclaim is required.

FIG. 2 is a block diagram illustrating a storage controller of FIG. 1 in detail, according to some embodiments of the present disclosure. Referring to FIGS. 1 and 2, the storage controller 110 may communicate with the host 11 and the non-volatile memory device 120. The storage controller 110 may include the command manager 111, the word line distribution calculator 112, the history table 113, a volatile memory device 114, a processor 115, a read only memory (ROM) 116, an error correcting code (ECC) engine 117, a host interface circuit 118, and a non-volatile memory interface circuit 119.

The command manager 111 may manage commands indicating operations to be performed in the non-volatile memory device 120. The word line distribution calculator 112 may calculate the word line gap value and may perform the reliability operation. The history table 113 may manage the read voltage levels in units of word line.

In some embodiments, the command manager 111, the word line distribution calculator 112, and the history table 113 may be implemented by a firmware module. For example, the processor 115 may implement the command manager 111, the word line distribution calculator 112, and the history table 113 by loading instructions stored in the non-volatile memory device 120 to the volatile memory device 114 and executing the loaded instructions. However, the present disclosure is not limited thereto. For example, the command manager 111, the word line distribution calculator 112, and the history table 113 may be implemented with separate hardware or may be implemented with a combination of hardware and software.

The volatile memory device 114 may be used as a main memory, a buffer memory, or a cache memory of the storage controller 110. The processor 115 may control an overall operation of the storage controller 110. The ROM 116 may be used as a read only memory that stores information necessary for the operation of the storage controller 110.

The ECC engine 117 may detect and correct an error of data obtained from the non-volatile memory device 120. For example, the ECC engine 117 may have an error correction capability of a given level. The ECC engine 117 may manage data having an error level (e.g., the number of flipped bits) exceeding the error correction capability as an uncorrectable data.

The storage controller 110 may communicate with the host 11 through the host interface circuit 118. In some embodiments, the host interface circuit 118 may be implemented based on at least one of various interfaces such as a serial ATA (SATA) interface, a peripheral component interconnect express (PCIe) interface, a serial attached SCSI (SAS) interface, a nonvolatile memory express (NVMe) interface, and a universal flash storage (UFS) interface.

The storage controller 110 may communicate with the non-volatile memory device 120 through the non-volatile memory interface circuit 119. In some embodiments, the non-volatile memory interface circuit 119 may be implemented based on a NAND interface.

Figure 3:
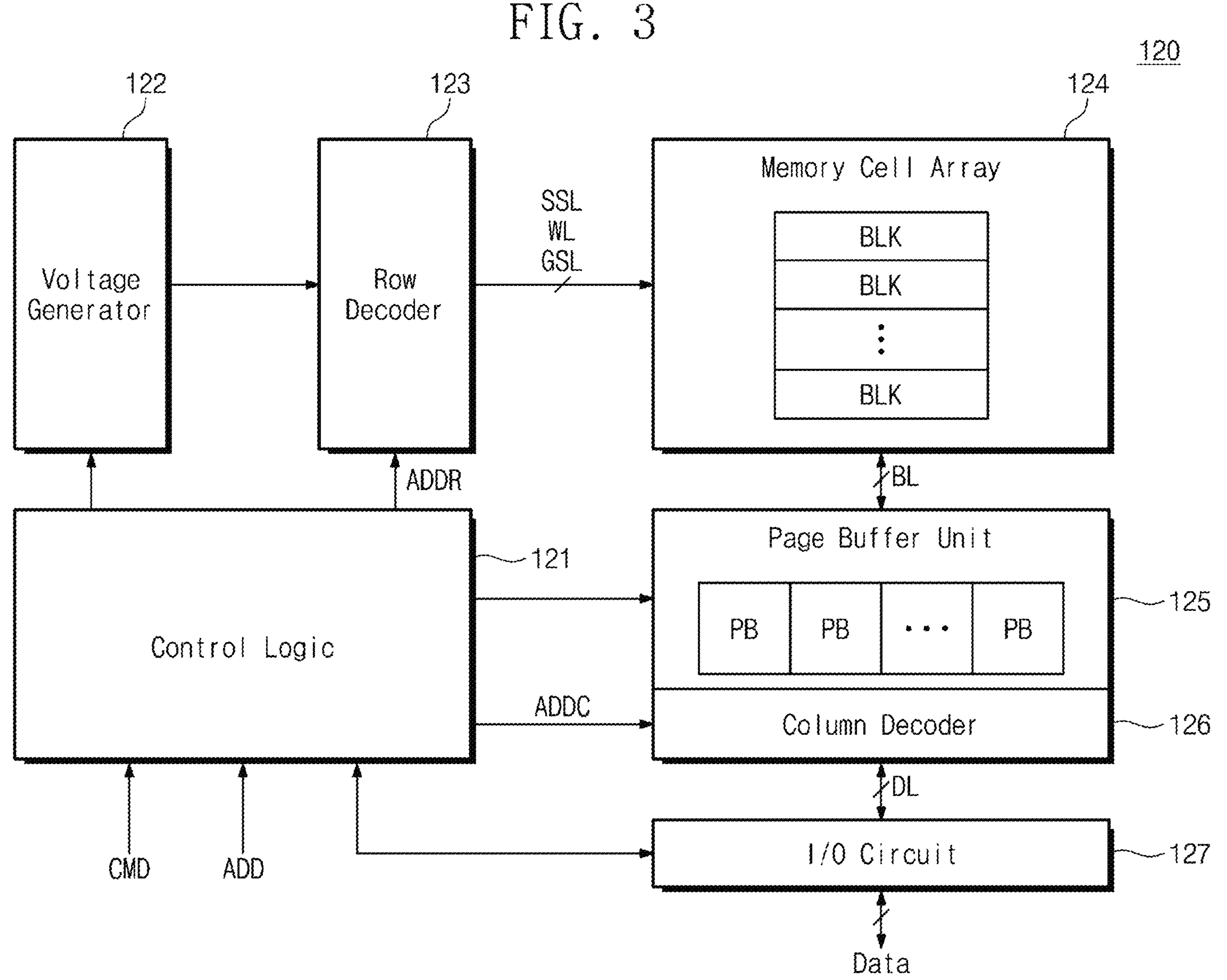
FIG. 3 is a block diagram illustrating a non-volatile memory device of FIG. 1 in detail, according to some embodiments of the present disclosure.
Figure 4:
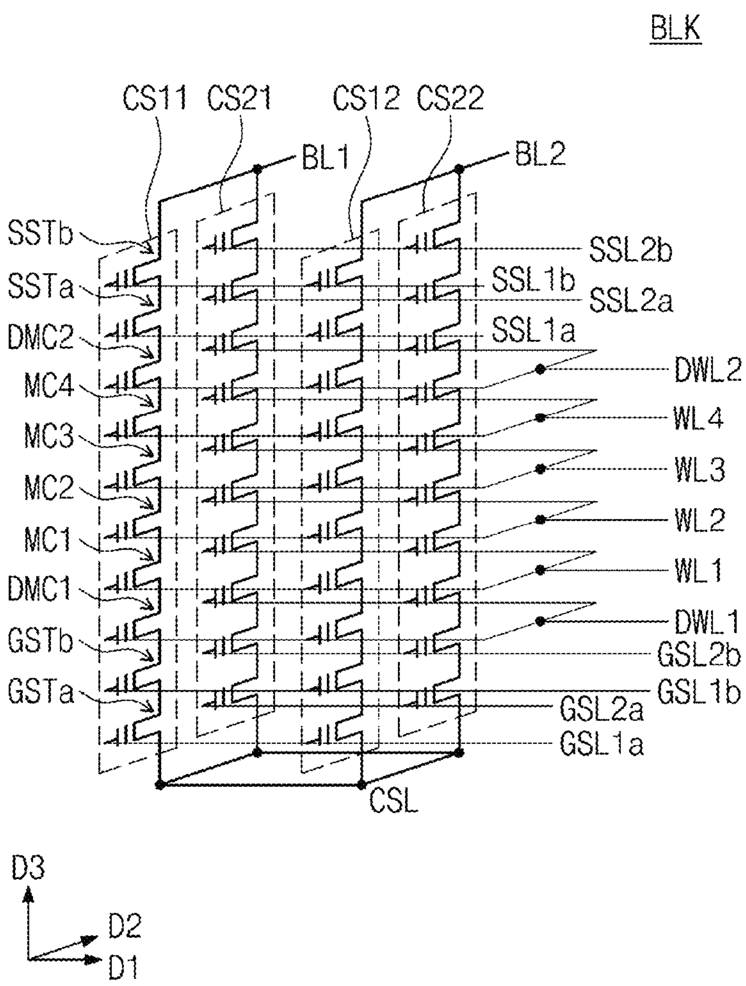
FIG. 4 is a diagram describing a memory block of a memory cell array of FIG. 3, according to some embodiments of the present disclosure.

FIG. 3 is a block diagram illustrating a non-volatile memory device of FIG. 1 in detail, according to some embodiments of the present disclosure. FIG. 4 is a diagram describing a memory block of a memory cell array of FIG. 3, according to some embodiments of the present disclosure. Referring to FIGS. 1, 3, and 4, the non-volatile memory device 120 may communicate with the storage controller 110. For example, the non-volatile memory device 120 may receive the address ADD and the command CMD from the storage controller 110. The non-volatile memory device 120 may exchange data with the storage controller 110.

The non-volatile memory device 120 may include control logic 121, a voltage generator 122, a row decoder 123, a memory cell array 124, a page buffer unit 125, a column decoder 126, and an input/output (I/O) circuit 127.

The control logic 121 may receive the command CMD and the address ADD from the storage controller 110. The command CMD may refer to a signal indicating an operation to be performed by the non-volatile memory device 120, such as a read operation, a write operation, or an erase operation. The address ADD may include a row address ADDR and a column address ADDC. The control logic 121 may control an overall operation of the non-volatile memory device 120 based on the command CMD and the address ADD. The control logic 121 may generate the row address ADDR and the column address ADDC based on the address ADD.

Under control of the control logic 121, the voltage generator 122 may control voltages to be applied to the memory cell array 124 through the row decoder 123.

The row decoder 123 may receive the row address ADDR from the control logic 121. The row decoder 123 may be connected with the memory cell array 124 through string selection lines SSL, word lines WL, and ground selection lines GSL. The row decoder 123 may decode the row address ADDR and may control voltages to be applied to the string selection lines SSL, the word lines WL, and the ground selection lines GSL based on a decoding result and a voltage received from the voltage generator 122.

The memory cell array 124 may include a plurality of memory blocks BLK. Each of the plurality of memory blocks BLK may be similar in structure to a memory block BLK illustrated in FIG. 4. The memory block BLK illustrated in FIG. 4 may correspond to a physical erase unit of the non-volatile memory device 120, but the present disclosure is not limited thereto. For example, the physical erase unit may be changed to a page unit, a word line unit, a sub-block unit, etc.

Below, for convenience of description, a first direction D1, a second direction D2, and a third direction D3 will be mentioned. The first direction D1 may be a direction parallel to a semiconductor substrate (not illustrated) where the memory block BLK is formed. The second direction D2 may be a direction that is perpendicular to the first direction D1. The third direction D3 may be a direction that is perpendicular to a plane defined by the first direction D1 and the second direction D2. For example, the third direction D3 may be a direction perpendicular to the semiconductor substrate (not illustrated). The first direction D1, the second direction D2, and the third direction D3 may be referred to as a "row direction", a "column direction", and a "height direction", respectively.

As illustrated in FIG. 4, the memory block BLK may include a plurality of cell strings CS11, CS12, CS21, and CS22. The plurality of cell strings CS11, CS12, CS21, and CS22 may be arranged in the first direction D1 and the second direction D2. For brevity of drawing, four cell strings CS11, CS12, CS21, and CS22 are illustrated in FIG. 4, but the present disclosure is not limited thereto. For example, the number of cell strings may increase or decrease in the first direction D1 or the second direction D2.

Cell strings placed at the same column from among the plurality of cell strings CS11, CS12, CS21, and CS22 may be connected with the same bit line. For example, the cell strings CS11 and CS21 may be connected with a first bit line BL1, and the cell strings CS12 and CS22 may be connected with a second bit line BL2. Each of the plurality of cell strings CS11, CS12, CS21, and CS22 may include a plurality of cell transistors. The plurality of cell transistors may be stacked in the third direction D3.

The plurality of cell transistors in each cell string may be connected in series between the corresponding bit line (e.g., BL1 or BL2) and a common source line CSL. For example, the plurality of cell transistors may include string selection transistors SSTa and SSTb, dummy memory cells DMC1 and DMC2, memory cells MC1 to MC4, and ground selection transistors GSTa and GSTb. The serially-connected string selection transistors SSTa and SSTb may be provided between the serially-connected memory cells MC1 to MC4 and a corresponding bit line (e.g., BL1 and BL2). As used herein, "serially-connected" refers to an element being connected in series. The serially-connected ground selection transistors GSTa and GSTb may be provided between the serially-connected memory cells MC1 to MC4 and the common source line CSL.

In some embodiments, the second dummy memory cell DMC2 may be provided between the serially-connected string selection transistors SSTa and SSTb and the serially-connected memory cells MC1 to MC4, and the first dummy memory cell DMC1 may be provided between the serially-connected memory cells MC1 to MC4 and the serially-connected ground selection transistors GSTa and GSTb.

In the plurality of cell strings CS11, CS12, CS21, and CS22, memory cells placed at the same height from among the memory cells MC1 to MC4 may share the same word line. For example, the first memory cells MC1 of the plurality of cell strings CS11, CS12, CS21, and CS22 may be placed at the same height from the semiconductor substrate (not illustrated) and may share the first word line WL1. The second memory cells MC2 of the plurality of cell strings CS11, CS12, CS21, and CS22 may be placed at the same height from the semiconductor substrate (not illustrated) and may share the second word line WL2. Likewise, the third memory cells MC3 of the plurality of cell strings CS11, CS12, CS21, and CS22 may be placed at the same height from the semiconductor substrate (not illustrated) and may share the third word line WL3, and the fourth memory cells MC4 of the plurality of cell strings CS11, CS12, CS21, and CS22 may be placed at the same height from the semiconductor substrate (not illustrated) and may share the fourth word line WL4.

Dummy memory cells placed at the same height from among the dummy memory cells DMC1 and DMC2 of the plurality of cell strings CS11, CS12, CS21, and CS22 may share the same dummy word line. For example, the first dummy memory cells DMC1 of the plurality of cell strings CS11, CS12, CS21, and CS22 may share a first dummy word line DWL1, and the second dummy memory cells DMC2 of the plurality of cell strings CS11, CS12, CS21, and CS22 may share a second dummy word line DWL2.

String selection transistors placed at the same height and the same row from among the string selection transistors SSTa and SSTb of the plurality of cell strings CS11, CS12, CS21, and CS22 may share the same string selection line. For example, the string selection transistors SSTb of the cell strings CS11 and CS12 may share a string selection line SSL1*b*, and the string selection transistors SSTa of the cell strings CS11 and CS12 may share a string selection line SSL1*a*. The string selection transistors SSTb of the cell strings CS21 and CS22 may be connected with a string selection line SSL2*b*, and the string selection transistors SSTa of the cell strings CS21 and CS22 may be connected with a string selection line SSL2*a*.

Ground selection transistors placed at the same height and the same row from among the ground selection transistors GSTa and GSTb of the plurality of cell strings CS11, CS12, CS21, and CS22 may be connected with the same ground selection line. For example, the ground selection transistors GSTb of the cell strings CS11 and CS12 may be connected with a ground selection line GSL1*b*, and the ground selection transistors GSTa of the cell strings CS11 and CS12 may be connected with a ground selection line GSL1*a*. The ground selection transistors GSTb of the cell strings CS21 and CS22 may be connected with a ground selection line GSL2*b*, and the ground selection transistors GSTa of the cell strings CS21 and CS22 may be connected with a ground selection line GSL2*a*.

In some embodiments, the memory block BLK illustrated in FIG. 4 is an example. For example, the number of cell strings may increase or decrease, and the number of rows of cell strings and the number of columns of cell strings may increase or decrease depending on the number of cell strings. Also, in the memory block BLK, the number of cell transistors may increase or decrease, the height of the memory block BLK may increase or decrease depending on the number of cell transistors, and the number of lines connected with the cell transistors may increase or decrease depending on the number of cell transistors.

In some embodiments, the memory block BLK may include a plurality of pages. For example, the first memory cells MC1 of the cell strings CS11, CS12, CS21, and CS22 connected with the first word lines WL1 may be referred to as a "first physical page".

In some embodiments, one physical page may correspond to a plurality of logical pages. For example, in the case where a memory cell is a triple level cell (TLC) storing information corresponding to 3 bits, a physical page may correspond to 3 logical pages. A multi-level cell storing two or more bits will be described in detail with reference to FIGS. 5A, 5B, and 5C together.

Referring again to FIGS. 1 and 3, the page buffer unit 125 may include a plurality of page buffers PB. The page buffer unit 125 may be connected with the memory cell array 124 through the bit lines BL. The page buffer unit 125 may read data from the memory cell array 124 in units of page, by sensing voltages of the bit lines BL.

The column decoder 126 may receive the column address ADDC from the control logic 121. The column decoder 126 may decode the column address ADDC and may provide the data read by the page buffer unit 125 to the I/O circuit 127 based on a decoding result.

The column decoder 126 may receive data from the I/O circuit 127 through data lines DL. The column decoder 126 may receive the column address ADDC from the control logic 121. The column decoder 126 may decode the column address ADDC and may provide the data received from the I/O circuit 127 to the page buffer unit 125 based on a decoding result. The page buffer unit 125 may store the data provided from the I/O circuit 127 in the memory cell array 124 through the bit lines BL in units of page.

The I/O circuit 127 may be connected with the column decoder 126 through the data lines DL. The I/O circuit 127 may provide data received from the storage controller 110 to the column decoder 126 through the data lines DL. The I/O circuit 127 may output data received through the data lines DL to the storage controller 110.

Figure 5A:
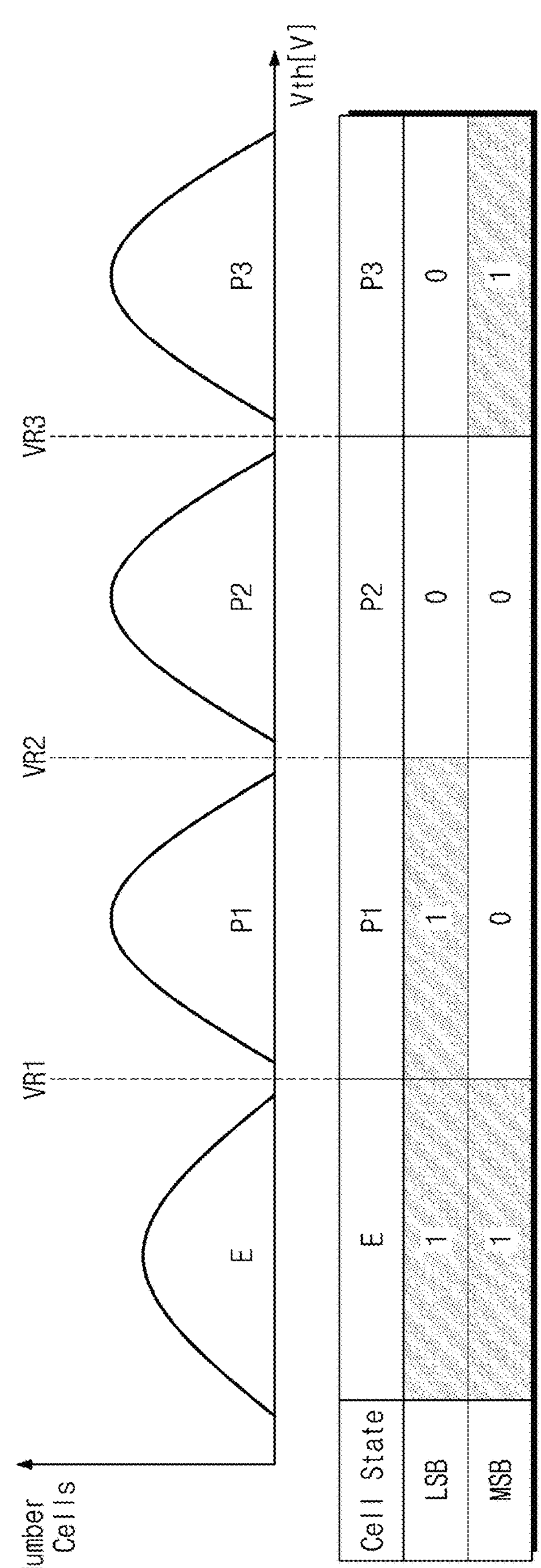
FIG. 5A is a diagram illustrating threshold voltage distributions of multi-level cells according to some embodiments of the present disclosure.

FIG. 5A is a diagram illustrating threshold voltage distributions of multi-level cells according to some embodiments of the present disclosure. A graph of threshold voltage distributions of multi-level cells MLC each storing 2 bits and a bit table for each page corresponding to the threshold voltage distributions are illustrated in FIG. 5A. Below, for convenience of description, the multi-level cell MLC is intended to refer to a memory cell storing 2 bits, a memory cell storing 3 bits is referred to as a "triple level cell TLC", and a memory cell storing 4 bits is referred to as a "quadruple level cell QLC".

In the graph of the multi-level cell MLC, a horizontal axis represents a threshold voltage (e.g., a level of a threshold voltage), and a vertical axis represents the number of memory cells. The multi-level cell MLC may have one of an erase state "E" and first to third programming states P1, P2, and P3 in which the threshold voltage distributions sequentially increase.

In the multi-level cell MLC, a first read voltage level VR1 may refer to a voltage for distinguishing the erase state "E" from the first programming state P1. A second read voltage level VR2 may refer to a voltage for distinguishing the first programming state P1 from the second programming state P2. A third read voltage level VR3 may refer to a voltage for distinguishing the second programming state P2 from the third programming state P3.

Referring to the table of the multi-level cell MLC, a most significant bit MSB and a least significant bit LSB according to a cell state are illustrated. A physical page corresponding to the multi-level cell MLC storing two bits may correspond to a first logical page and a second logical page. In the multi-level cell MLC, the first logical page may indicate the least significant bit LSB, and the second logical page may indicate the most significant bit MSB.

In some embodiments, each of the first to third read voltage levels VR1 to VR3 of the multi-level cell MLC may correspond to one of a plurality of logical pages. For example, in the multi-level cell MLC, the read operation corresponding to the first logical page may be performed based on the second read voltage level VR2. The read operation corresponding to the second logical page may be performed based on the first read voltage level VR1 and the third read voltage level VR3.

FIG. 5B is a diagram illustrating threshold voltage distributions of triple level cells according to some embodiments of the present disclosure. A graph of threshold voltage distributions of the triple level cells TLC each storing 3 bits and a bit table for each page corresponding to the threshold voltage distributions are illustrated in FIG. 5B.

In the graph of the triple level cell TLC, a horizontal axis represents a threshold voltage (e.g., a level of a threshold voltage), and a vertical axis represents the number of memory cells. The triple level cell TLC may have one of an erase state "E" and first to seventh programming states P1, P2, P3, P4, P5, P6, and P7 in which threshold voltage distributions sequentially increase.

In the triple level cell TLC, a first read voltage level VR1 may refer to a voltage for distinguishing the erase state "E"

from the first programming state P1. Likewise, each of second to seventh read voltage levels VR2 to VR7 may refer to a voltage for distinguishing each of the second to seventh programming states P2 to P7 from a previous state (i.e., an immediately previous state having a low threshold voltage distribution).

Referring to the table of the triple level cell TLC, a least significant bit LSB, a center significant bit CSB, and a most significant bit MSB according to a cell state are illustrated. A physical page corresponding to the triple level cell TLC storing 3 bits may correspond to a first logical page, a second logical page, and a third logical page. In the triple level cell TLC, the first logical page may indicate the least significant bit LSB, the second logical page may indicate the center significant bit CSB, and the third logical page may indicate the most significant bit MSB.

In some embodiments, each of the first to seventh read voltage levels VR1 to VR7 of the triple level cell TLC may correspond to one of a plurality of logical pages. For example, in the triple level cell TLC, the read operation corresponding to the first logical page may be performed based on the first read voltage level VR1 and the fifth read voltage level VR5. The read operation corresponding to the second logical page may be performed based on the second read voltage level VR2, the fourth read voltage level VR4, and the sixth read voltage level VR6. The read operation corresponding to the third logical page may be performed based on the third read voltage level VR3 and the seventh read voltage level VR7.

FIG. 5C is a diagram illustrating threshold voltage distributions for quadruple level cells, according to some embodiments of the present disclosure. A graph of threshold voltage distributions of the quadruple level cells QLC each storing 4 bits and a bit table for each page corresponding to the threshold voltage distributions are illustrated in FIG. 5C.

In the graph of the quadruple level cell QLC, a horizontal axis represents a threshold voltage (e.g., a level of a threshold voltage), and a vertical axis represents the number of memory cells. The quadruple level cell QLC may have one of an erase state "E" and first to fifteenth programming states P1, P2, P3, P4, P5, P6, P7, P8, P9, P10, P11, P12, P13, P14, and P15 in which threshold voltage distributions sequentially increase.

In the quadruple level cell QLC, a first read voltage level VR1 may refer to a voltage for distinguishing the erase state "E" from the first programming state P1. Likewise, each of second to fifteenth read voltage levels VR2 to VR15 may refer to a voltage for distinguishing each of the second to fifteenth programming states P2 to P15 from a previous state (i.e., an immediately previous state having a low threshold voltage distribution).

Referring to the table of the quadruple level cell QLC, a least significant bit LSB, a first center significant bit ESB, a second center significant bit USB, and a most significant bit MSB according to a cell state are illustrated. A physical page corresponding to the quadruple level cell QLC storing 4 bits may correspond to a first logical page, a second logical page, a third logical page, and a fourth logical page. In the quadruple level cell QLC, the first logical page may indicate the least significant bit LSB, the second logical page may indicate the first center significant bit ESB, the third logical page may indicate the second center significant bit USB, and the fourth logical page may indicate the most significant bit MSB.

In some embodiments, each of the first to fifteenth read voltage levels VR1 to VR15 of the quadruple level cell QLC may correspond to one of a plurality of logical pages. For example, in the quadruple level cell QLC, the read operation corresponding to the first logical page may be performed based on the first, fourth, sixth, and eleventh read voltage levels VR1, VR4, VR6, and VR11. The read operation corresponding to the second logical page may be performed based on the third, seventh, ninth, and thirteenth read voltage levels VR3, VR7, VR9, and VR13. The read operation corresponding to the third logical page may be performed based on the second, eighth, and fourteenth read voltage levels VR2, VR8, and VR14. The read operation corresponding to the fourth logical page may be performed based on the fifth, tenth, twelfth, and fifteenth read voltage levels VR5, VR10, VR12, and VR15.

As described above, the states and the read voltages of the multi-level cell MLC, the triple level cell TLC, and the quadruple level cell QLC are described with reference to FIGS. 5A, 5B, and 5C. However, the present disclosure is not limited thereto. For example, a combination of read voltage levels corresponding to each logical page may be variously changed or modified and one memory cell may store five or more bits.

FIG. 6 is a diagram describing a change of threshold voltage distributions according to some embodiments of the present disclosure. Threshold voltage distributions of an initial state and threshold voltage distributions of a retention state will be described with reference to FIG. 6. The initial state may refer to a state at a time (i.e., an initial time) when memory cells are programmed to form threshold voltage distributions. The retention state may refer to a state at a time when a given time passes from the initial state or a state at a time when the reliability operation is performed as threshold voltage distributions change.

In the graph of the initial state, a horizontal axis represents a threshold voltage (e.g., a level of a threshold voltage), and a vertical axis represents the number of memory cells. A threshold voltage level of each memory cell may correspond to one of the erase state "E" and the first to seventh programming states P1 to P7. A first initial read voltage level VR1*i* may be a voltage level of a valley optimized to distinguish memory cells of the erase state "E" from memory cells of the first programming state P1.

The optimized valley may indicate a voltage level at which the number of memory cells having an error bit (i.e., the number of memory cells each determined as a bit opposite to a programmed bit is stored) is minimized. A voltage level of the optimized valley corresponding to the erase state "E" and the first programming state P1 in the initial state may be the first initial read voltage level VR1*i*.

As in the above description, in the initial state, each of second to seventh initial read voltage levels VR2*i* to VR7*i* may indicate a voltage level of the valley optimized to distinguish each of the second to seventh programming states P2 to P7 from a previous state (i.e., an immediately previous state having a low threshold voltage distribution).

In the graph of the retention state, a horizontal axis represents a threshold voltage (e.g., a level of a threshold voltage), and a vertical axis represents the number of memory cells. A threshold voltage level of each memory cell may correspond to one of the erase state "E" and the first to seventh programming states P1 to P7. A first retention read voltage level VR1*r* may be a voltage level of a valley optimized to distinguish memory cells of the erase state "E" from memory cells of the first programming state P1. As in the above description, in the retention state, each of second to seventh retention read voltage levels VR2*r* to VR7*r* may indicate a voltage level of the valley optimized to distinguish each of the second to seventh programming states P2 to P7 from a previous state (i.e., an immediately previous state having a low threshold voltage distribution).

Referring to the graph of the initial state and the graph of the retention state together, each of the first to seventh initial read voltage levels VR1$i$ to VR7$i$ may be different from each of the first to seventh retention read voltage levels VR1$r$ to VR7$r$.

FIG. 7 is a diagram describing word lines of a memory block according to some embodiments of the present disclosure. Some of word lines of the memory block BLK will be described with reference to FIG. 7. The memory block BLK may correspond to the memory block BLK of the memory cell array 124 of FIG. 3 and the memory block BLK of FIG. 4. Memory cells of the memory block BLK may be implemented with a multi-level cell storing two bits.

The memory block BLK may include a plurality of word lines stacked in the third direction D3 from the semiconductor substrate. The plurality of word lines may share a plurality of bit lines.

For example, a 46th word line WL46, a 47th word line WL47, and a 48th word line WL48 may be sequentially stacked in the third direction D3 from the semiconductor substrate. A length or distance from the 48th word line WL48 to the semiconductor substrate may be greater than a length or distance from the 47th word line WL47 to the semiconductor substrate. A length or distance from the 47th word line WL47 to the semiconductor substrate may be greater than a length or distance from the 46th word line WL46 to the semiconductor substrate. The 46th word line WL46, the 47th word line WL47, and the 48th word line WL48 may share (M−1)-th bit line BLM−1, M-th bit line BLM, and (M+1)-th bit line BLM+1. Herein, “M” is an arbitrary natural number.

The memory block BLK may support a sequential program operation and a sequential read operation of a word line unit. The program operation may progress in a direction facing the semiconductor substrate in units of word line (in other words, the program operation may progress in the order from the highest word line to the lowest word line). The read operation may progress in a direction facing the semiconductor substrate in units of word line (in other words, the read operation may progress in the order from the highest word line to the lowest word line).

For example, in the case of storing data depending on the write command, the program operation may be performed on the memory cells MC of the 48th word line WL48 so as to have threshold voltage levels, may then be performed on the memory cells MC of the 47th word line WL47 so as to have threshold voltage levels, and may then be performed on the memory cells MC of the 46th word line WL46 so as to have threshold voltage levels.

As in the above description, in the case of reading data depending on the read command, the threshold voltage levels of the memory cells MC of the 48th word line WL48 may be read, the threshold voltage levels of the memory cells MC of the 47th word line WL47 may then be read, and the threshold voltage levels of the memory cells MC of the 46th word line WL46 may then be read.

However, the present disclosure is not limited thereto. For example, the program operation and the read operation may progress in a direction facing away from the semiconductor substrate (in other words, the program operation and the read operation may progress in the order from the lowest word line to the highest word line).

Each of the memory cells MC of the memory block BLK may have the erase state “E” and the first to third programming states P1 to P3.

For example, referring to the 48th word line WL48, the memory cells MC corresponding to the (M−1)-th bit line BLM−1, the M-th bit line BLM, and the (M+1)-th bit line BLM+1 may respectively have the erase state “E”, the first programming state P1, and the erase state “E”. Referring to the 47th word line WL47, the memory cells MC corresponding to the (M−1)-th bit line BLM−1, the M-th bit line BLM, and the (M+1)-th bit line BLM+1 may respectively have the first programming state P1, the erase state “E”, and the second programming state P2. Referring to the 46th word line WL46, the memory cells MC corresponding to the (M−1)-th bit line BLM−1, the M-th bit line BLM, and the (M+1)-th bit line BLM+1 may respectively have the erase state “E”, the third programming state P3, and the erase state “E”.

Each of the memory cells MC of the memory block BLK may be affected from adjacent memory cells by the cell coupling. For example, nowadays, due to the high integration and high capacity of semiconductor chips, the memory block BLK may include the plurality of memory cells MC arranged in a narrow space. The memory block BLK may include more than about 100,000 memory cells MC per word line. The memory cells MC may be adjacent to each other in the first direction D1, the second direction D2, and the third direction D3. The cell coupling may refer to a phenomenon where a threshold voltage level of a memory cell MC changes due to the influence of a threshold voltage level of an adjacent memory cell MC.

In the memory block BLK, a word line retention gap may be caused by the cell coupling between some word lines. The word line retention gap may refer to a phenomenon where the tendency of a threshold voltage distribution changes between adjacent word line groups. Even though memory cells are included in the same memory block BLK, the tendencies (or characteristics) of threshold voltage distributions may vary depending on word lines. To improve the reliability of data stored in the memory block BLK, there is a need for managing a threshold voltage distribution for each word line within the memory block BLK.

FIGS. 8A to 8D are diagrams describing threshold voltage distributions of word lines according to some embodiments of the present disclosure. In FIGS. 8A to 8D, the memory cells of the memory block BLK may be implemented with a quadruple level cell (QLC). The memory block BLK may include 45th to 48th word lines WL45 to WL48. The 48th word line WL48, the 47th word line WL47, the 46th word line WL46, and the 45th word line WL45 may be sequentially programmed.

In graphs of FIGS. 8A to 8D, a horizontal axis represents a threshold voltage (e.g., a level of a threshold voltage), and a vertical axis represents the number of memory cells for each word line. The waveform of the 48th word line WL48 is shown as a solid line. The waveform of the 47th word line WL47 is shown as a dashed line. The waveform of the 46th word line WL46 is shown as a dotted line. The waveform of the 45th word line WL45 is shown as a dash-single dotted line. According to some embodiments, there may be a programming delay time between a point in time when the 47th word line WL47 is programmed and a point in time when the 46th word line WL46 is programmed.

Figure 8A:
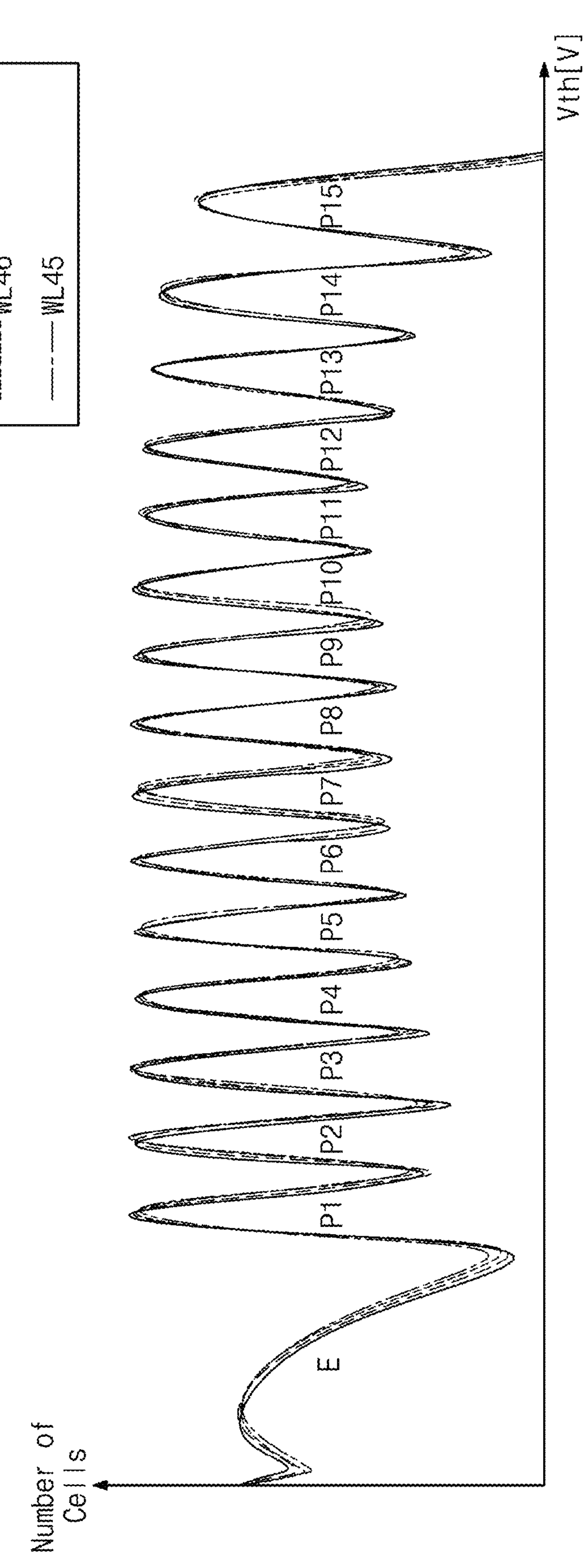
FIGS. 8A to 8D are diagrams describing threshold voltage distributions of word lines according to some embodiments of the present disclosure.

Referring to FIG. 8A, there may be no programming delay time between the 47th word line WL47 and the 46th word line WL46. A difference between threshold voltage distributions of the 47th and 46th word lines WL47 and WL46 may be greater than a difference between threshold voltage distributions of other word lines.

Figure 8B:
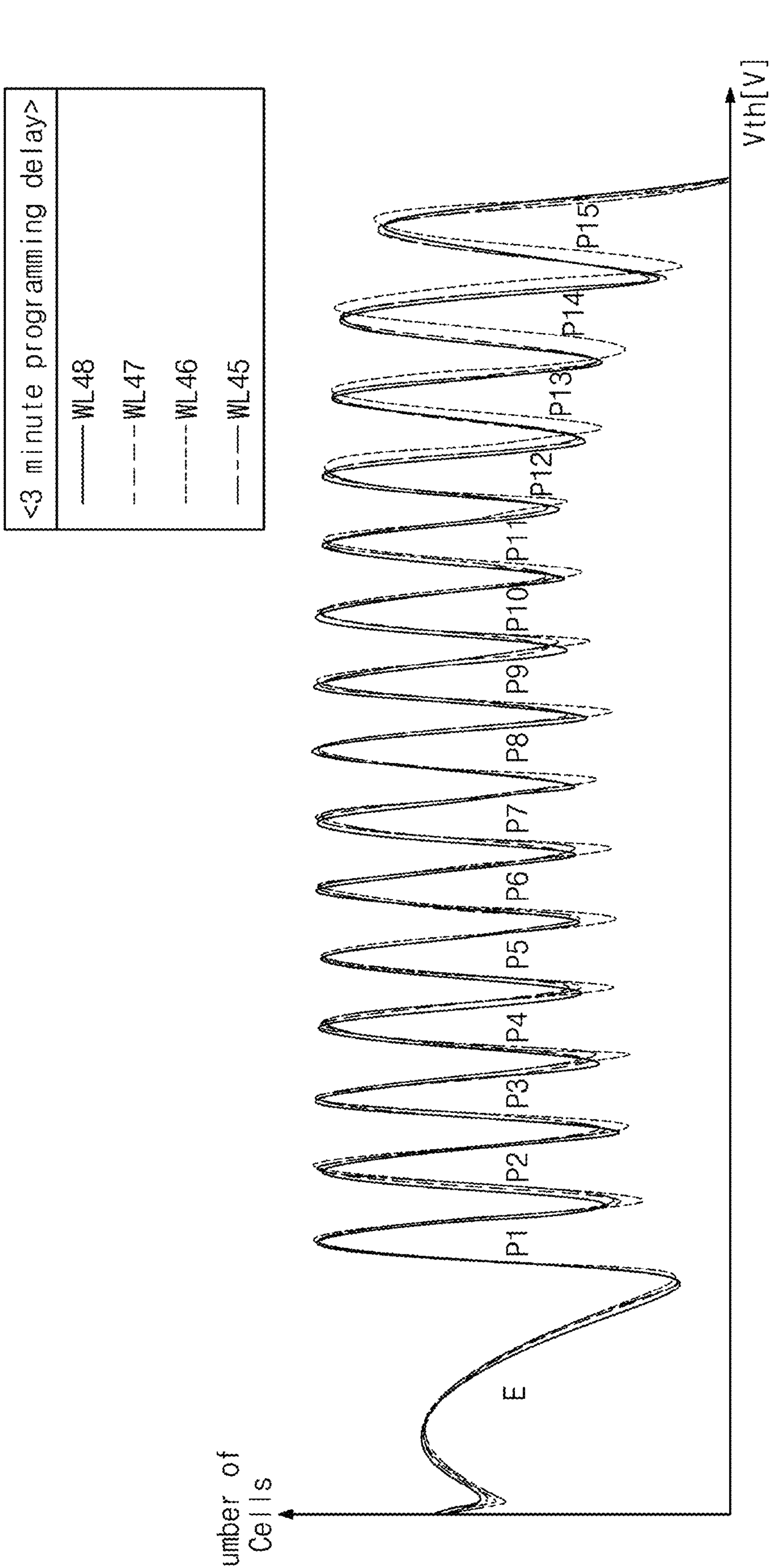

Referring to FIG. 8B, a programming delay time between the 47th word line WL47 and the 46th word line WL46 may be 3 minutes. A difference between threshold voltage distributions of the 47th and 46th word lines WL47 and WL46 may be greater than a difference between threshold voltage distributions of other word lines. The difference between the threshold voltage distributions of the 47th and 46th word lines WL47 and WL46 may be greater than the difference between the threshold voltage distributions of the 47th and 46th word lines WL47 and WL46 of FIG. 8A.

Figure 8C:
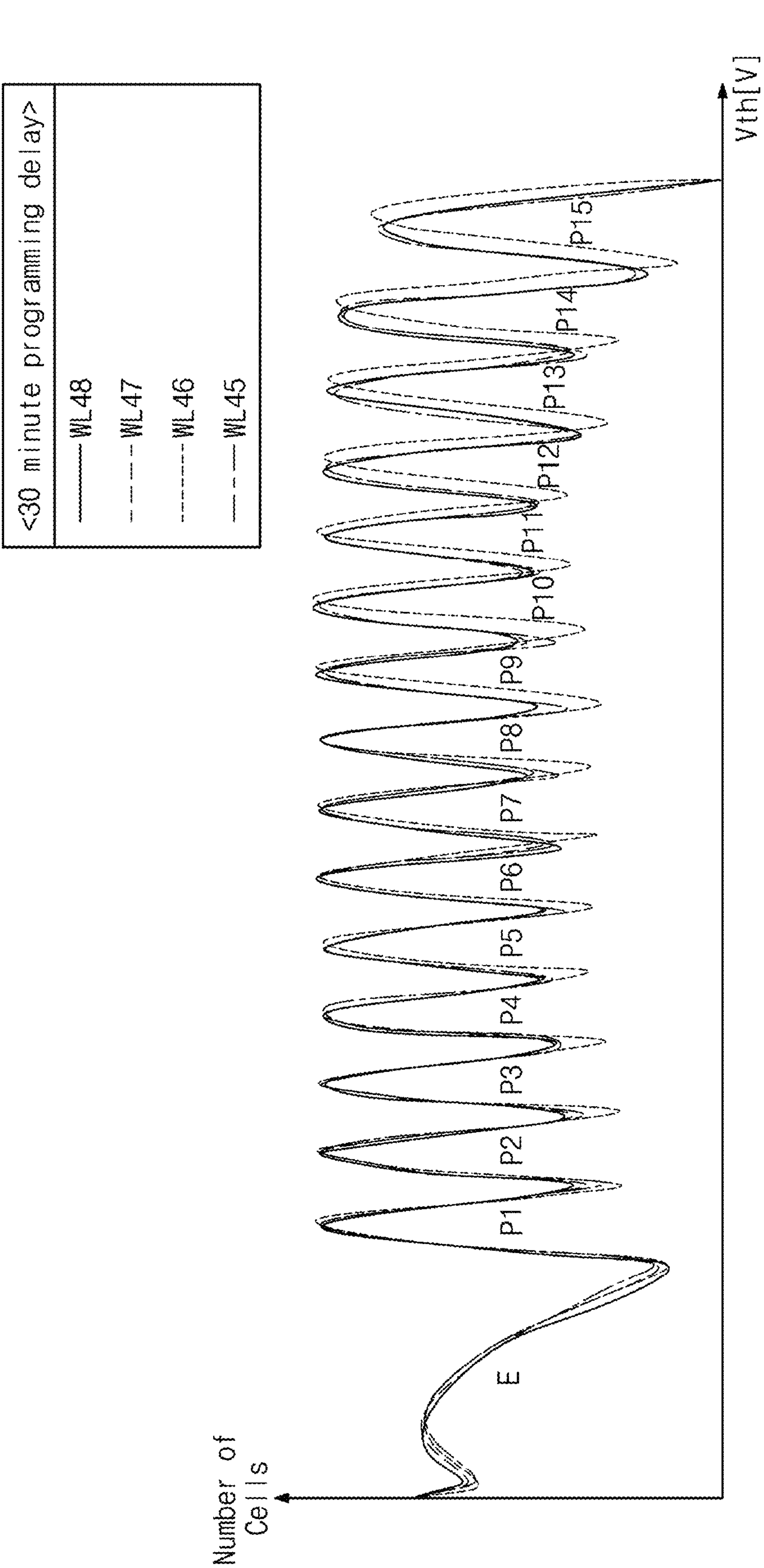

Referring to FIG. 8C, a programming delay time between the 47th word line WL47 and the 46th word line WL46 may be 30 minutes. A difference between threshold voltage distributions of the 47th and 46th word lines WL47 and WL46 may be greater than a difference between threshold voltage distributions of other word lines. The difference between the threshold voltage distributions of the 47th and 46th word lines WL47 and WL46 may be greater than the difference between the threshold voltage distributions of the 47th and 46th word lines WL47 and WL46 of FIGS. 8A and 8B.

Figure 8D:
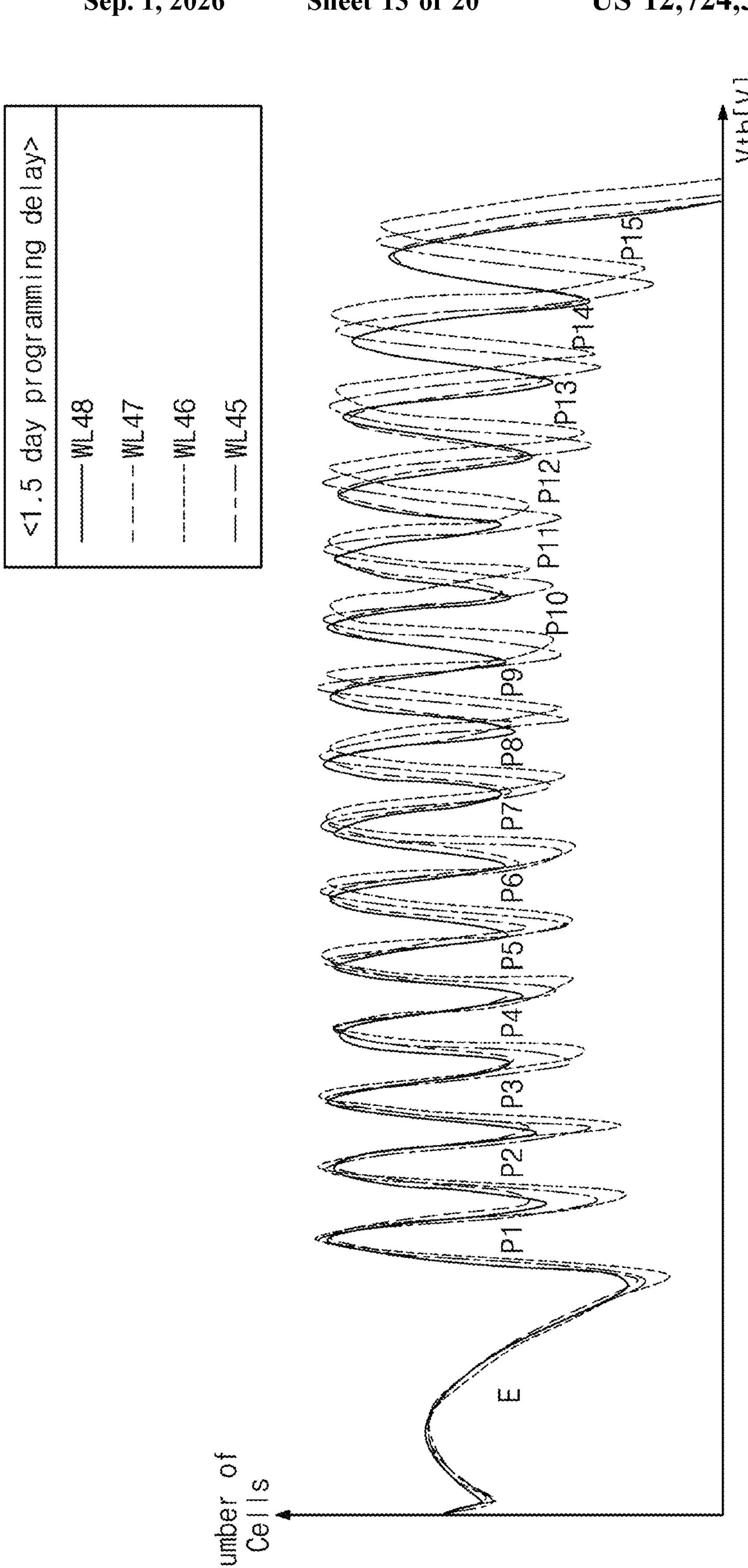

Referring to FIG. 8D, a programming delay time between the 47th word line WL47 and the 46th word line WL46 may be 1.5 days. A difference between threshold voltage distributions of the 47th and 46th word lines WL47 and WL46 may be greater than a difference between threshold voltage distributions of other word lines. The difference between the threshold voltage distributions of the 47th and 46th word lines WL47 and WL46 may be greater than the difference between the threshold voltage distributions of the 47th and 46th word lines WL47 and WL46 of FIGS. 8A, 8B, and 8C.

In some embodiments, the existence of the retention gap between the 47th and 46th word lines WL47 and WL46 may be predicted based on a word line gap value between the 48th and 47th word lines WL48 and WL47. For example, when the retention gap exists between the 47th and 46th word lines WL47 and WL46, a word line gap value between the 48th and 47th word lines WL48 and WL47 may exceed the first threshold value. This will be described in detail with reference to FIG. 9.

Figure 9:
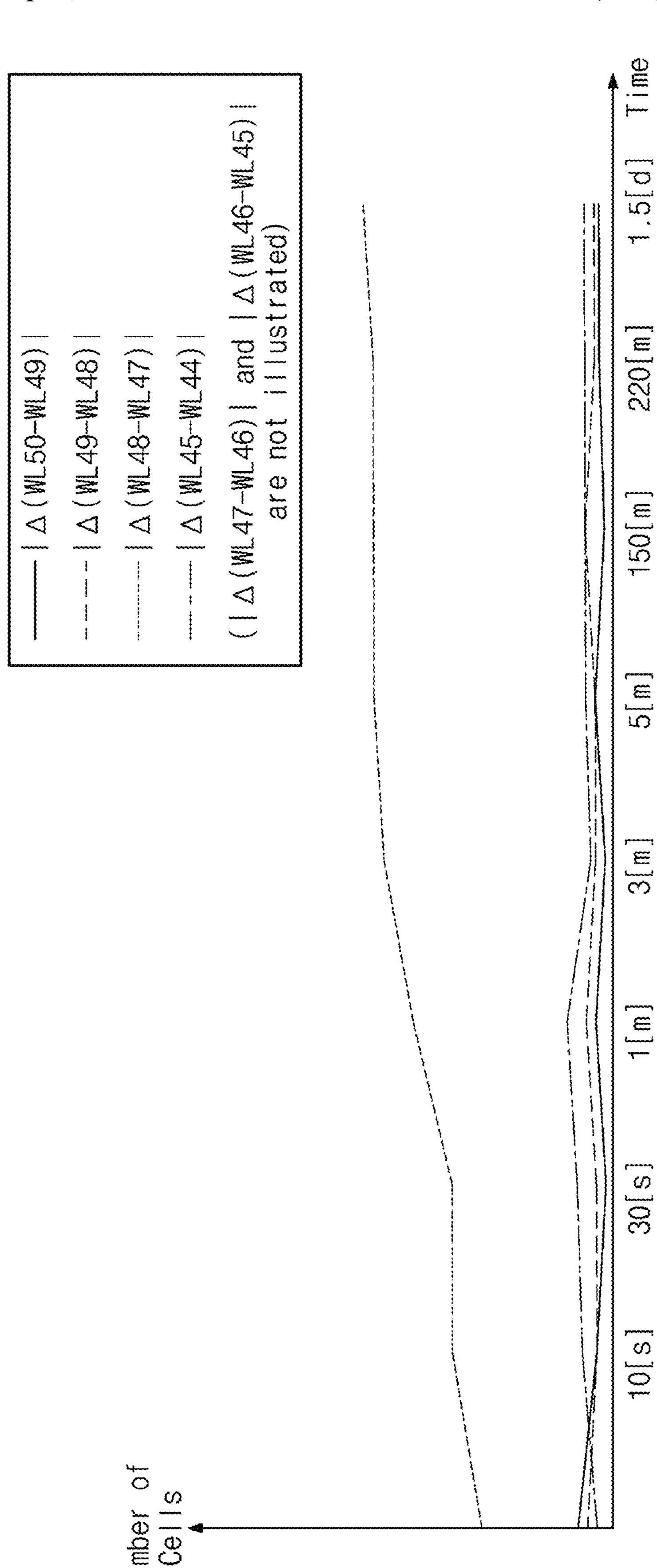
FIG. 9 is a graph describing a word line gap value according to some embodiments of the present disclosure.

FIG. 9 is a graph describing a word line gap value according to some embodiments of the present disclosure. A word line gap value corresponding to a pair of adjacent word lines will be described with reference to FIG. 9. In FIG. 9, a horizontal axis represents a time, and a vertical axis represents the number of memory cells.

The 50th word line WL50, the 49th word line WL49, the 48th word line WL48, the 47th word line WL47, the 46th word line WL46, and the 45th word line WL45 may be sequentially stacked in a direction perpendicular to the semiconductor substrate (not shown). The program operation and the read operation may be performed in the order of the 50th word line WL50, the 49th word line WL49, the 48th word line WL48, the 47th word line WL47, the 46th word line WL46, and the 45th word line WL45.

The retention gap may exist between the 47th word line WL47 and the 46th word line WL46. A word line gap value of the 47th and 46th word lines WL47 and WL46 may be significantly great, and a word line gap value of the 46th and 45th word lines WL46 and WL45 may be similar to a word line gap value of the 48th and 47th word lines WL48 and WL47. Waveforms of the word line gap value of the 47th and 46th word lines WL47 and WL46 and the word line gap value of the 46th and 45th word lines WL46 and WL45 are not illustrated in FIG. 9.

The waveform of the word line gap value of the 50th and 49th word lines WL50 and WL49 is shown as a solid line. The waveform of the word line gap value of the 49th and 48th word lines WL49 and WL48 is shown as a dashed line. The waveform of the word line gap value of the 48th and 47th word lines WL48 and WL47 is shown by a dotted line. The waveform of the word line gap value of the 45th and 44th word lines WL45 and WL44 is shown as a dash-single dotted line.

The word line gap value may be determined based on word line read data of a pair of adjacent word lines. For example, the memory block BLK may include the first word line and the second word line adjacent to each other. With regard to a logical page corresponding to a target read voltage level, each of memory cells of the first and second word lines may have a first bit value (e.g., "1") or a second bit value (e.g., "0").

As the read operation is performed on the first word line, first word line read data may be obtained. The first word line read data may indicate the number of first memory cells, which are determined based on the target read voltage level as having the first bit value, from among the memory cells of the first word line.

As in the above description, as the read operation is performed on the second word line, second word line read data may be obtained. The second word line read data may indicate the number of second memory cells, which are determined based on the target read voltage level as having the first bit value, from among the memory cells of the second word line.

A word line gap value of the first and second word lines may indicate an absolute value of a difference between the first word line read data and the second word line read data. For example, a word line gap value of the first and second word lines may correspond to an absolute value of a difference between the number of first memory cells having the first bit value and the number of second memory cells having the first bit value.

In some embodiments, the target read voltage level may be used to distinguish the erase state from the first programming state. For example, in the multi-level cell MLC of FIG. 5A, the target read voltage level may be the first read voltage level VR1 that is used to determine the most significant bit MSB. In the triple level cell TLC of FIG. 5B, the target read voltage level may be the first read voltage level VR1 that is used to determine the least significant bit LSB. In the quadruple level cell QLC of FIG. 5C, the target read voltage level may be the first read voltage level VR1 that is used to determine the least significant bit LSB.

In some embodiments, a storage device (e.g., the storage device 100 of FIG. 1) may predict a threshold voltage distribution of a next word line based on word line read data of two adjacent word lines. For example, referring to the graph of FIG. 9, when the retention gap exists between the 47th word line WL47 and the 46th word line WL46, the word line gap value of the 48th and 47th word lines WL48 and WL47 may be greater than the word line gap value of the 50th and 49th word lines WL50 and WL49, the word line gap value of the 49th and 48th word lines WL49 and WL48, and the word line gap value of the 45th and 44th word lines WL45 and WL44. Whether the retention gap exists between the 47th and 46th word lines WL47 and WL46 may be predicted based on the word line gap value between the 48th and 47th word lines WL48 and WL47.

When the word line gap value between the 48th and 47th word lines WL48 and WL47 exceeds the first threshold value, the storage device 100 of FIG. 1 may determine that the retention gap may exist between the 47th word line WL47 and the 46th word line WL46. The storage device 100 of FIG. 1 may adjust (i.e., optimize) the read voltage levels of the 46th word line WL46, based on the word line gap value of the 48th and 47th word lines WL48 and WL47.

In some embodiments, the storage device (e.g., the storage device 100 of FIG. 1) may determine whether the read reclaim operation of the target memory block is required, based on the word line gap value. For example, referring to the graph of FIG. 9, the word line gap value of the 48th and 47th word lines WL48 and WL47 may increase over time. That is, there may be a correlation between the word line gap value of the 48th and 47th word lines WL48 and WL47 and an amount of time that has elapsed.

When the word line gap value between the 48th and 47th word lines WL48 and WL47 exceeds a second threshold value, the storage device 100 of FIG. 1 may determine that the read reclaim of the target memory block including the 48th and 47th word lines WL48 and WL47 is required. Afterwards, the storage device 100 of FIG. 1 may perform the read reclaim operation on the target memory block.

FIG. 10 is a diagram describing a method of operating a storage device according to some embodiments of the present disclosure. Referring to FIG. 10, the storage device 100 may include the storage controller 110 and the non-volatile memory device 120. The storage controller 110 may include the command manager 111, the word line distribution calculator 112, and the history table 113. The non-volatile memory device 120 may include the control logic 121, the memory cell array 124, and the I/O circuit 127.

The command manager 111 may generate a request indicating the word line sequential read operation of the target memory block. The target memory block may include the first to N-th word lines WL1 to WLN. The word line sequential read operation may refer to an operation in which the read operation is sequentially performed from the N-th word line WLN to the first word line WL1 one by one. First to N-th word line read data respectively corresponding to the first to N-th word lines WL1 to WLN may be obtained through the word line sequential read operation. Each of the first to N-th word line read data may indicate the number of memory cells, which are determined based on the target read voltage level as having the first bit value, from among memory cells of the corresponding word line. In other words, each of the first to N-th word line read data may indicate a number of memory cells from memory cells of the corresponding word line having the first bit value, and the number of memory cells having the first bit value may be determined based on the target read voltage level.

In some embodiments, the target read voltage level may be used to distinguish the erase state "E" from the first programming state P1. Information about the target read voltage level may be included in the request indicating the word line sequential read operation.

The word line distribution calculator 112 may calculate the word line gap value based on the word line read data corresponding to two adjacent word lines and may perform the reliability operation based on the word line gap value. The reliability operation may include adjusting the read voltage level and determining whether the read reclaim operation is required. For example, the reliability operation may include adjusting the read voltage level for a third word line and determining whether the read reclaim operation is required for a target memory block that includes the two adjacent word lines and the third word line. For example, the third word line may be adjacent to one of the two adjacent word lines.

For example, the word line distribution calculator 112 may calculate the word line gap value corresponding to the (K+1)-th and K-th word lines WLK+1 and WLK, based on (K+1)-th word line read data corresponding to the (K+1)-th word lines WLK+1 and K-th word line read data corresponding to the K-th word lines WLK. Herein, "K" may be a natural number less than "N". When the word line gap value exceeds a first threshold value TH1, the word line distribution calculator 112 may adjust (i.e., optimize) the read voltage level of the (K−1)-th word line WLK−1, based on the word line gap value. The first threshold value TH1 may refer to a value that is used to determine whether to adjust the read voltage level.

As another example, when the word line gap value exceeds a second threshold value TH2, the word line distribution calculator 112 may determine that the read reclaim operation of the target memory block is required. For example, the word line distribution calculator 112 may generate a request through the command manager 111 indicating the read reclaim operation of the target memory block in response to determining that the word line gap value exceeds the second threshold value TH2. The second threshold value TH2 may refer to a value that is used to determine whether to perform the read reclaim operation. The second threshold value TH2 may be greater than the first threshold value TH1. The read reclaim operation may include operations of reading data of the target memory block by using the adjusted read voltage level, writing the read data in a new memory block, and erasing the target memory block. The history table 113 may manage the read voltage levels of the plurality of word lines WL1 to WLN of the target memory block. For example, when the word line gap value corresponding to the (K+1)-th and K-th word lines WLK+1 and WLK exceeds the first threshold value TH1, the word line distribution calculator 112 may update the read voltage level of the (K−1)-th word line WLK−1 in the history table 113 based on the word line gap value. The updated read voltage level of the history table 113 may be used for the following read operation or read reclaim operation.

The control logic 121 may communicate with the command manager 111 and the memory cell array 124. The control logic 121 may perform an operation corresponding to a request received from the command manager 111. For example, the control logic 121 may generate the first to N-th word line read data by performing the word line sequential read operation on the target memory block based on the request received from the command manager 111.

The memory cell array 124 may include the first to L-th memory blocks BLK1 to BLKL. Herein, "L" is an arbitrary natural number. Each of the first to L-th memory blocks BLK1 to BLKL may include the plurality of word lines WL1 to WLN. The word line sequential read operation may refer to an operation in which the read operation is sequentially performed from the N-th word line WLN to the first word line WL1 in units of word line, that is, one by one. The first memory block BLK1 among the first to L-th memory blocks BLK1 to BLKL may be referred to as a "target memory block".

The I/O circuit 127 may communicate with the memory cell array 124 and the storage controller 110. Under control of the control logic 121, the I/O circuit 127 may provide the storage controller 110 with the word line read data received from the memory cell array 124.

Below, a method of operating the storage device 100 according to some embodiments of the present disclosure will be described in detail with reference to FIG. 10.

In a first operation ①, the command manager 111 may provide the non-volatile memory device 120 with the request indicating the word line sequential read operation of the target memory block (e.g., BLK1). The control logic 121 may perform the word line sequential read operation based on the request from the command manager 111. For example, as the read operation of the (K+1)-th word line WLK+1 is performed under control of the control logic 121, the (K+1)-th word line read data WDT_K+1 corresponding to the (K+1)-th word line WLK+1 may be generated. Afterwards, as the read operation of the K-th word line WLK is performed under control of the control logic 121, the K-th word line read data WDT_K corresponding to the K-th word line WLK may be generated.

In some embodiments, a length or distance from the (K+1)-th word line WLK+1 to the semiconductor substrate (not shown) may be greater than a length or distance from the K-th word line WLK to the semiconductor substrate (not shown).

In a second operation ②, the I/O circuit 127 may provide the word line distribution calculator 112 with the (K+1)-th word line read data WDT_K+1 received from the memory cell array 124.

In a third operation ③, the I/O circuit 127 may provide the word line distribution calculator 112 with the K-th word line read data WDT_K received from the memory cell array 124.

In a fourth operation ④, the word line distribution calculator 112 may calculate the word line gap value corresponding to the (K+1)-th and K-th word lines WLK+1 and WLK, based on the (K+1)-th and K-th word line read data WDT_K+1 and WDT_K. The word line gap value may refer to an absolute value of a difference between the (K+1)-th word line read data WDT_K+1 and the K-th word line read data WDT_K.

The K-th word line read data WDT_K may indicate the number of memory cells, which are determined based on the target read voltage level as having the first bit value (i.e., are determined based on the target read voltage level as having the erase state "E"), from among the memory cells of the K-th word line WLK. For example, the K-th word line read data WDT_K may indicate a first number of memory cells from the memory cells of the K-th word line WLK having the first bit value, and the first number of memory cells may be determined based on the target read voltage level. The (K+1)-th word line read data WDT_K+1 may indicate the number of memory cells, which are determined based on the target read voltage level as having the first bit value (i.e., are determined based on the target read voltage level as having the erase state "E"), from among the memory cells of the (K+1)-th word line WLK+1. For example, the (K+1)-th word line read data WDT_K+1 may indicate a second number of memory cells from the memory cells of the (K+1)-th word line WLK+1 having the first bit value, and the second number of memory cells may be determined based on the target read voltage level. Each of the memory cells of K-th word line WLK and the (K+1)-th word line WLK+1 may have one of the first bit value or the second bit value.

In a fifth operation ⑤, the word line distribution calculator 112 may adjust the read voltage level based on the word line gap value or may determine whether the read reclaim operation is required, based on the word line gap value.

For example, when the word line gap value exceeds the first threshold value TH1, the word line distribution calculator 112 may adjust the read voltage level of the corresponding word line in the history table 113, based the word line gap value. The adjustment of the read voltage level may include adjusting all the read voltage levels for distinguishing all states (i.e., an erase state and programming states) that memory cells are able to have, as well as the target read voltage level.

As another example, when the word line gap value exceeds the second threshold value TH2, the word line distribution calculator 112 may determine that the read reclaim operation of the target memory block (e.g., BLK1) is required. For example, the word line distribution calculator 112 may generate a request through the command manager 111 indicating the read reclaim operation of the target memory block in response to determining that the word line gap value exceeds the second threshold value TH2.

In some embodiments, the word line distribution calculator 112 may predict the read voltage level of the next word line based on the word line gap value. For example, when the word line gap value of the (K+1)-th and K-th word lines WLK+1 and WLK exceeds the first threshold value TH1, the word line distribution calculator 112 may adjust the read voltage level of the (K−1)-th word line WLK−1 based on the word line gap value of the (K+1)-th and K-th word lines WLK+1 and WLK.

Figure 11:
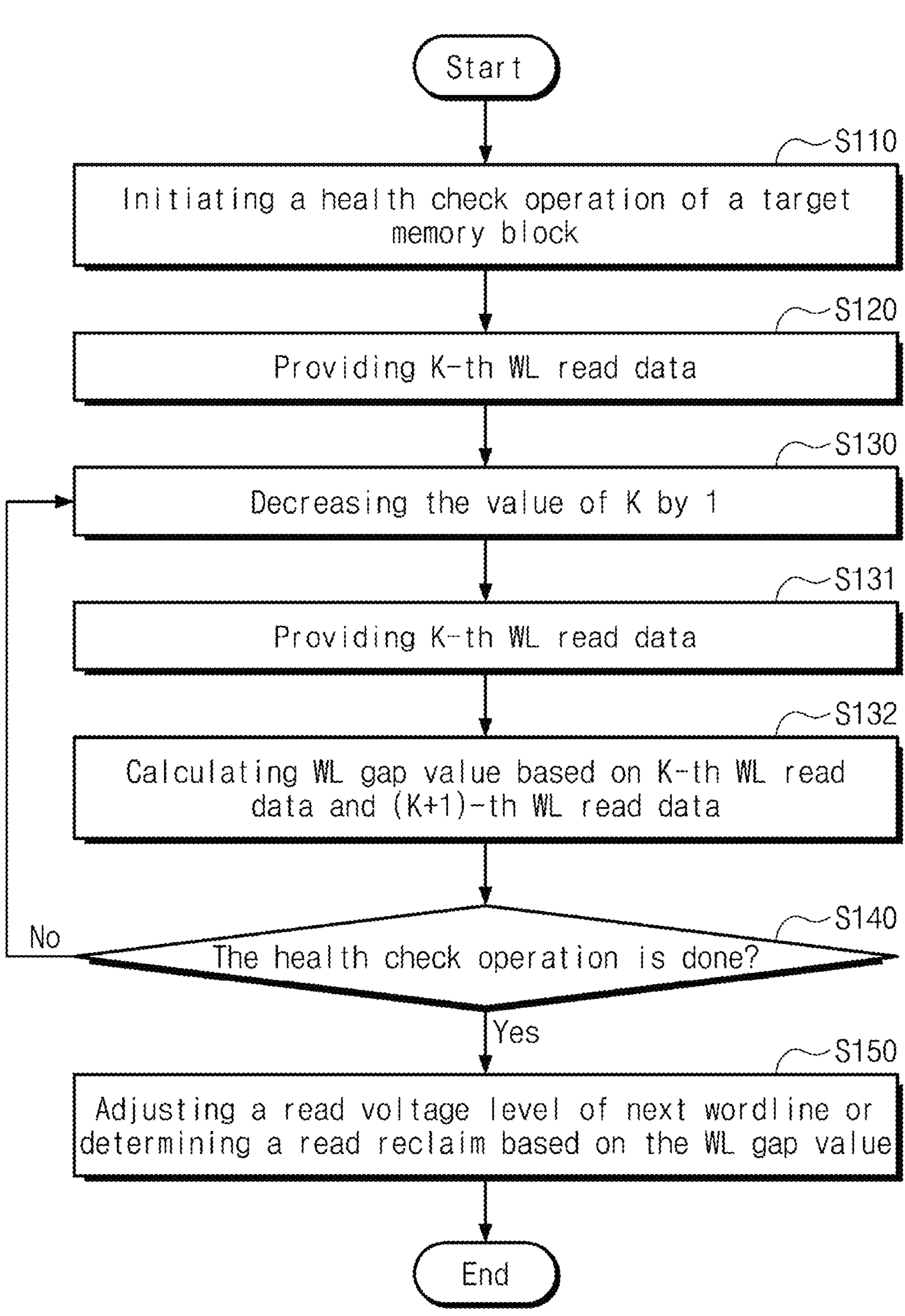
FIG. 11 is a flowchart describing a method of operating a storage device according to some embodiments of the present disclosure.

FIG. 11 is a flowchart describing a method of operating a storage device according to some embodiments of the present disclosure. A method of operating a storage device according to some embodiments of the present disclosure will be described with reference to FIG. 11. The storage device may include a storage controller and a non-volatile memory device. The storage device may correspond to the storage device 100 of FIG. 10.

In operation S110, the storage controller may start a health check operation of a target memory block. The health check operation may refer to an operation of checking a degradation state of the non-volatile memory device periodically or depending on an internal algorithm of the firmware, regardless of the host request. The health check operation in operation S110 may be referred to as a "patrol read operation" or a "scan read operation".

In operation S120, the non-volatile memory device may provide K-th word line read data. When the health check operation is performed for the first time after the power supply is turned on or reset, "K" may be "N". Herein, "K" may refer to an index indicating a word line targeted for a current read operation. Herein, "N" may refer to the number of word lines included in the target memory block.

In some embodiments, the storage controller may store (or back up) the K-th word line read data provided in operation S120. The K-th word line read data may be used to calculate a word line gap value of K-th and (K−1)-th word lines.

In operation S130, the non-volatile memory device may decrease a value of "K" as much as "1". The value of "K" may be updated from the original "K" to "K−1". The updated value of "K" may be equal to the value of subtracting 1 from the value of original "K". Then, the non-volatile memory device may prepare the read operation of the next word line.

In operation S131, the non-volatile memory device may provide K-th word line read data. The K-th word line read data may be equal to (K−1)-th word line read data at the operation S120.

In some embodiments, the storage controller may store (or back up) the K-th word line read data provided in operation S131. The K-th word line read data may be used to calculate a word line gap value of the K-th and (K+1)-th word lines. The (K+1)-th word line read data may be equal to the K-th word line read data at the operation S120. Also, the K-th word line read data may be further used to calculate a word line gap value of the K-th and (K−1)-th word lines in a next cycle (i.e., after performing operation S140).

In operation S132, the storage controller may calculate the word line gap value based on the K-th word line read data and the (K+1)-th word line read data. The storage controller of the storage device may store the word line gap value.

In some embodiments, the storage controller may calculate the word line gap value based on the backed-up word line read data. For example, the storage controller may store the word line gap value based on the word line read data stored in the previous cycle (e.g., the backed-up word line read data) and the word line read data received from the non-volatile memory device in the current cycle. For example, the storage controller may use the backed-up word line read data from the previous cycle and the word line read data received from the non-volatile memory device in the current cycle to calculate the word line gap value.

In operation S140, the storage controller may determine whether the health check operation is completed. The health check operation may be performed until receiving the word line read data of all the word lines in the target memory block. For example, when "K" is "1", the storage controller may determine that the health check operation is completed. When it is determined that the health check operation is not completed, the storage controller may again perform operation S130. When it is determined that the health check operation is completed, the storage controller may perform operation S150.

In operation S150, based on the word line gap value, the storage controller may adjust the read voltage level or may determine whether the read reclaim operation of the target memory block is required.

In some embodiments, the word line gap value in operation S150 may include word line gap values corresponding to all pairs of adjacent word lines among the "N" word lines of the target memory block.

Figure 12:
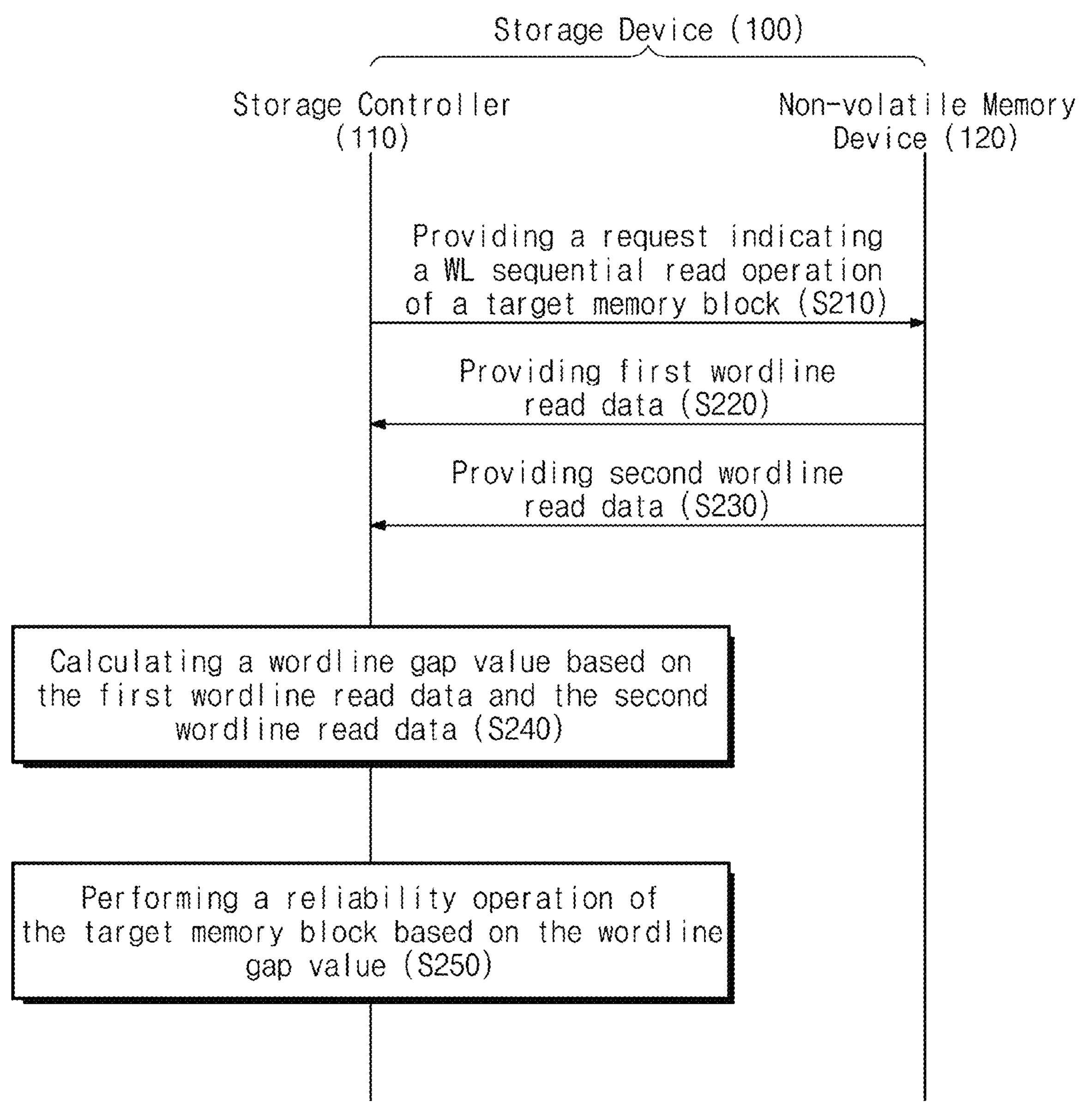
FIG. 12 is a flowchart describing a method of operating a storage device according to some embodiments of the present disclosure.

FIG. 12 is a flowchart describing a method of operating a storage device according to some embodiments of the present disclosure. A method of operating a storage device according to some embodiments of the present disclosure will be described with reference to FIG. 12. The storage device 100 may include the storage controller 110 and the non-volatile memory device 120. The storage device 100 may correspond to the storage device 100 of FIG. 10 or the storage device of FIG. 11.

In operation S210, the storage controller 110 may provide the non-volatile memory device 120 with the request indicating the word line sequential read operation of the target memory block.

In operation S220, the non-volatile memory device 120 may provide first word line read data to the storage controller 110. In operation S230, the non-volatile memory device 120 may provide second word line read data to the storage controller 110. In operation S240, the storage controller 110 may calculate the word line gap value based on the first word line read data and the second word line read data. For example, the storage controller 110 may calculate the word line gap value by calculating an absolute value of a difference between the first word line read data and the second word line read data. The first word line read data and the second word line read data may respectively correspond to the (K+1)-th word line read data WDT_K+1 and the K-th word line read data WDT_K of FIG. 10.

In operation S250, the storage controller 110 may perform the reliability operation of the target memory block based on the word line gap value. The reliability operation may include adjusting the read voltage level of the third word line for each word line and determining whether the read reclaim of the target memory block is required. The third word line may correspond to the (K−1)-th word line WLK−1 of FIG. 10.

Figure 13:
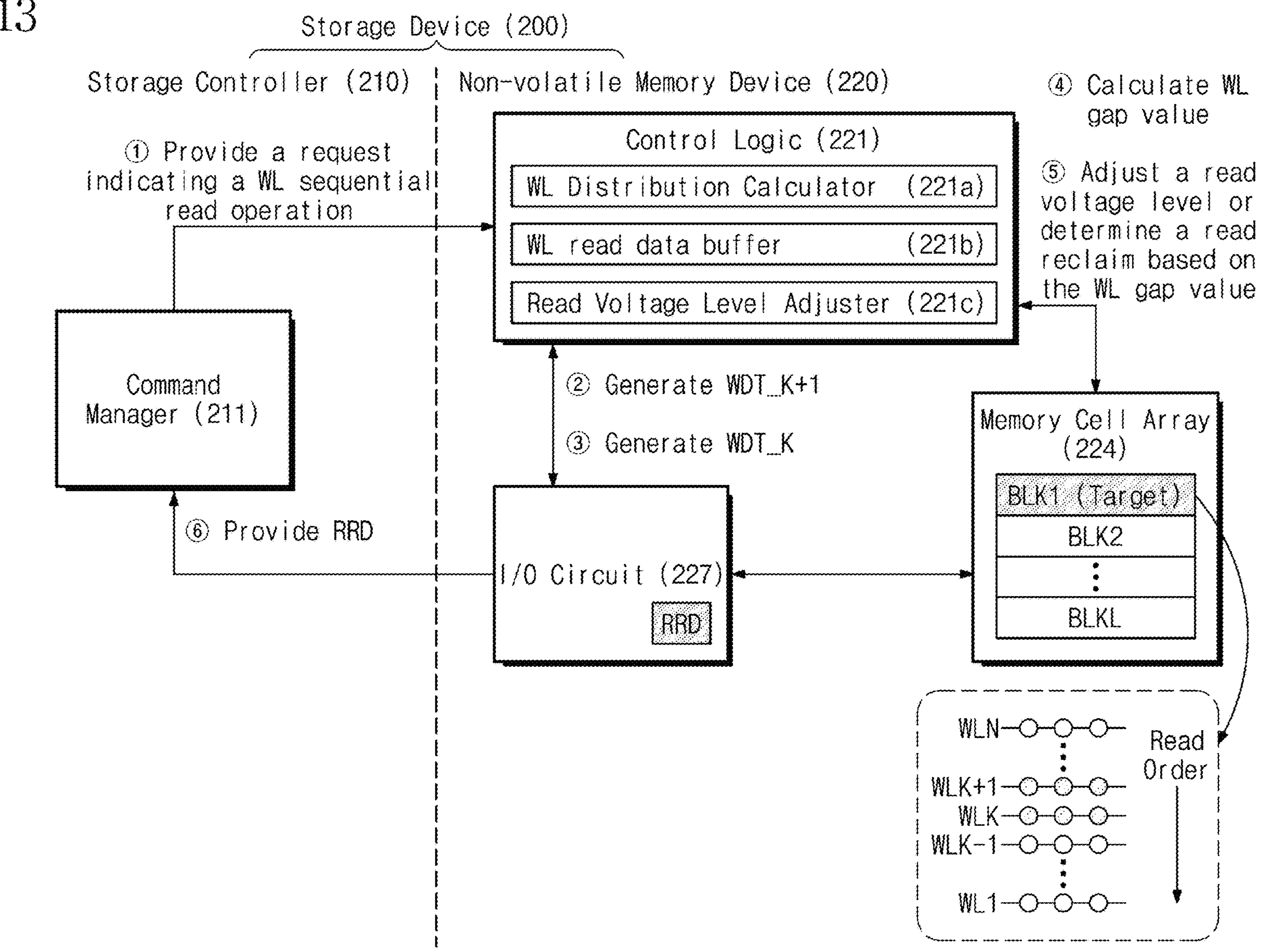
FIG. 13 is a diagram describing a method of operating a storage device according to some embodiments of the present disclosure.

FIG. 13 is a diagram describing a method of operating a storage device according to some embodiments of the present disclosure. Referring to FIG. 13, a storage device 200 may include a storage controller 210 and a non-volatile memory device 220. The storage controller 210 may include a command manager 211. The non-volatile memory device 220 may include control logic 221, a memory cell array 224, and an I/O circuit 227. The control logic 221 may include a word line distribution calculator 221*a*, a word line read data buffer 221*b*, and a read voltage level adjuster 221*c*.

The word line distribution calculator 221*a* may calculate the word line gap value and may perform the reliability operation. Functions of the word line distribution calculator 221*a* may be similar to the functions of the word line distribution calculator 112 of FIG. 10.

The word line read data buffer 221*b* may store a plurality of word line read data generated by the word line sequential read operation.

The read voltage level adjuster 221*c* may manage the read voltage levels of the first to N-th word lines WL1 to WLN of the target memory block. For example, the read voltage level adjuster 221*c* may be implemented with an E-fuse latch circuit and may differently manage the read voltage level for each word line.

The memory cell array 224 may include the first to L-th memory blocks BLK1 to BLKL. Each of the first to L-th memory blocks BLK1 to BLKL may include the plurality of word lines WL1 to WLN. The first memory block BLK1 may be referred to as a "target memory block".

The I/O circuit 227 may communicate with the control logic 221 and the memory cell array 224. The I/O circuit 227 may receive read reclaim determination data from the control logic 221. The read reclaim determination data may indicate whether the read reclaim of the target memory block is required.

Below, a method of operating the storage device 200 according to some embodiments of the present disclosure will be described in detail with reference to FIG. 13.

In a first operation ①, the command manager 211 may provide the non-volatile memory device 220 with the request indicating the word line sequential read operation of the target memory block. The word line sequential read operation may refer to an operation in which the read operation is sequentially performed from the N-th word line WLN to the first word line WL1 in units of word line, that is, one by one.

In a second operation ②, as the read operation of the (K+1)-th word line WLK+1 is performed under control of the control logic 221, the (K+1)-th word line read data WDT_K+1 may be generated. The control logic 221 may receive the (K+1)-th word line read data WDT_K+1 from the memory cell array 224 through the I/O circuit 227. The word line read data buffer 221*b* may store the (K+1)-th word line read data WDT_K+1.

In a third operation ③, as the read operation of the K-th word line WLK is performed under control of the control logic 221, the K-th word line read data WDT_K may be generated. The control logic 221 may receive the K-th word line read data WDT_K from the memory cell array 224 through the I/O circuit 227. The word line read data buffer 221*b* may store the K-th word line read data WDT_K.

In a fourth operation ④, the word line distribution calculator 221*a* may calculate the word line gap value corresponding to the (K+1)-th and K-th word lines WLK+1 and WLK, based on the (K+1)-th and K-th word line read data WDT_K+1 and WDT_K. For example, the word line distribution calculator 221*a* may calculate the word line gap value by calculating an absolute value of a difference between the (K+1)-th word line read data WDT_K+1 and the K-th word line read data WDT_K.

In a fifth operation ⑤, based on the word line gap value, the word line distribution calculator 221*a* may adjust the read voltage level or may determine whether the read reclaim operation is required.

For example, when the word line gap value of the (K+1)-th and K-th word lines WLK+1 and WLK exceeds the first threshold value TH1, the word line distribution calculator 221*a* may adjust the read voltage level of the (K−1)-th word line WLK−1 based on the word line gap value through the read voltage level adjuster 221*c*.

As another example, when the word line gap value exceeds the second threshold value TH2, the word line distribution calculator 221*a* may determine that the read reclaim operation of the target memory block is required. In this case, the word line distribution calculator 221*a* may generate read reclaim determination data RRD indicating the read reclaim operation.

In a sixth operation ⑥, after the word line distribution calculator 221*a* generates the read reclaim determination data RRD, the word line distribution calculator 221*a* may provide the read reclaim determination data RRD to the command manager 211 through the I/O circuit 227. The command manager 211 may generate the request indicating the read reclaim operation, based on the read reclaim determination data RRD.

FIG. 14 is a flowchart describing a method of operating a storage device according to some embodiments of the present disclosure. A method of operating a storage device according to some embodiments of the present disclosure will be described with reference to FIG. 14. The storage device may include a storage controller and a non-volatile memory device. The storage device may correspond to the storage device 200 of FIG. 13.

In operation S310, the storage controller may start the health check operation of the target memory block.

In operation S320, the storage controller may provide the request indicating the word line sequential read operation.

In operation S330, the non-volatile memory device may perform the read operation on a logical page of a word line. In some embodiments, the non-volatile memory device may support the on-chip operation. For example, the non-volatile memory device may perform the on-chip valley search (OVS) operation and may perform the sequential read operation while adjusting (i.e., optimizing) the read voltage level for each word line.

In operation S340, the non-volatile memory device may determine whether the current logical page is a target logical page. The target logical page may refer to a bit corresponding to the target read voltage level. For example, in the multi-level cell MLC, the target logical page may refer to the most significant bit MSB corresponding to the first read voltage level VR1 (refer to FIG. 5A). In the triple level cell TLC, the target logical page may refer to the least significant bit LSB corresponding to the first read voltage level VR1 (refer to FIG. 5B). In the quadruple level cell QLC, the target logical page may refer to the least significant bit LSB corresponding to the first read voltage level VR1 (refer to FIG. 5C).

When it is determined in operation S340 that the current logical page is the target logical page, the non-volatile memory device may perform operation S350. When it is determined in operation S340 that the current logical page is not the target logical page, the non-volatile memory device may perform operation S360.

In operation S350, the non-volatile memory device may calculate the word line gap value. In operation S351, the non-volatile memory device may store (i.e., back up) the current word line read data. In operation S352, based on the word line gap value, the non-volatile memory device may adjust the read voltage level or may determine whether the read reclaim operation is required.

In operation S360, the non-volatile memory device may determine whether the word line sequential read operation is completed. When it is determined that the word line sequential read operation is completed, the operation of the non-volatile memory device may be finished. When it is determined that the word line sequential read operation is not completed, the non-volatile memory device may perform operation S370.

In operation S370, the non-volatile memory device may move to a next logical page or a next word line. After operation S370 is performed, the non-volatile memory device may again perform operation S330.

Figure 15:
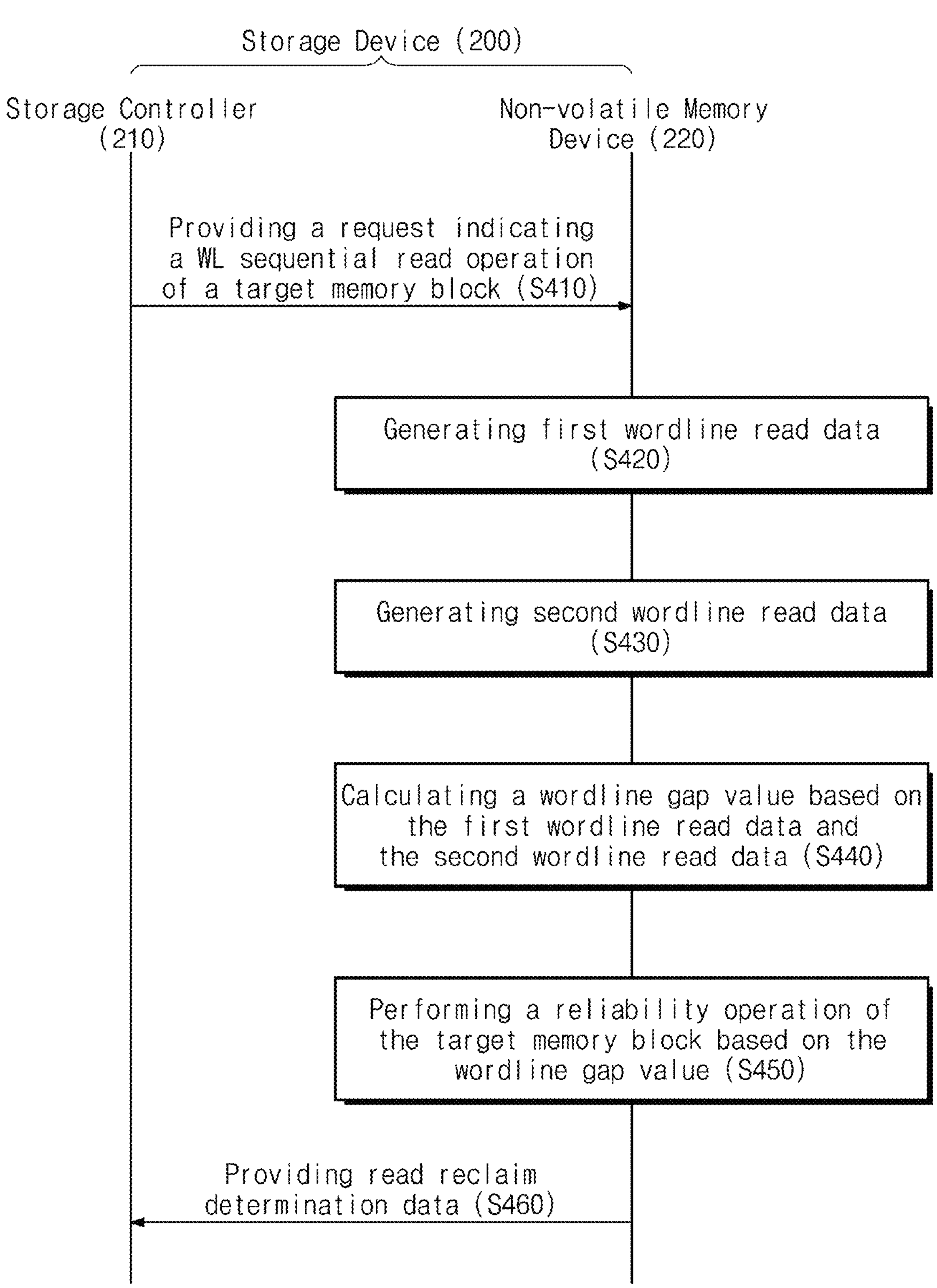
FIG. 15 is a flowchart describing a method of operating a storage device according to some embodiments of the present disclosure.

FIG. 15 is a flowchart describing a method of operating a storage device according to some embodiments of the present disclosure. A method of operating a storage device according to some embodiments of the present disclosure will be described with reference to FIG. 15. The storage device 200 may include the storage controller 210 and the non-volatile memory device 220. The storage device 200 may correspond to the storage device 200 of FIG. 13 or the storage device of FIG. 14.

In operation S410, the storage controller 210 may provide the non-volatile memory device 220 with the request indicating the word line sequential read operation of the target memory block.

In operation S420, the non-volatile memory device 220 may generate first word line read data. In operation S430, the non-volatile memory device 220 may generate second word line read data. The first word line read data and the second word line read data may respectively correspond to the (K+1)-th word line read data WDT_K+1 and the K-th word line read data WDT_K of FIG. 13. In operation S440, the non-volatile memory device 220 may calculate the word line gap value based on the first word line read data and the second word line read data. For example, the non-volatile memory device 220 may calculate the word line gap value by calculating an absolute value of a difference between the first word line read data and the second word line read data.

In operation S450, the non-volatile memory device 220 may perform the reliability operation of the target memory block based on the word line gap value. The reliability operation may include adjusting the read voltage level of the third word line and generating the read reclaim determination data indicating the read reclaim operation of the target memory block. The third word line may correspond to the (K−1)-th word line WLK−1 of FIG. 13. For example, the third word line may be adjacent to the second word line (e.g., adjacent to the K-th word line WLK of FIG. 13).

In operation S460, the non-volatile memory device 220 may provide the read reclaim determination data to the storage controller 210. The storage controller 210 may generate the request indicating the read reclaim operation, based on the read reclaim determination data.

According to example embodiments of the present disclosure, storage devices calculating a word line gap value and methods of operating the same are provided.

Also, a storage device that analyzes a threshold voltage distribution for each word line, and not for each memory block, such that a read voltage level is optimized in units of word line, the number of times of a read retry operation is decreased, and whether a read reclaim is required is accurately determined, and methods of operating the same are provided.

As used herein, the terms "comprises", "comprising", "includes", "including", "has", "having" and/or any other variations specify the presence of the stated features, integers, steps, operations, elements, and/or components, but do not preclude the presence or addition of one or more other features, integers, steps, operations, elements, components, and/or groups thereof.

While the present disclosure has been described with reference to example embodiments thereof, it will be apparent to those of ordinary skill in the art that various changes and modifications may be made thereto without departing from the scope of the present disclosure as set forth in the following claims.

What is claimed is:

1. A method of operating a storage device which includes a storage controller and a non-volatile memory device, the method comprising:

providing, by the storage controller, a first request indicating a word line sequential read operation of a target memory block of the non-volatile memory device, wherein each memory cell of the target memory block has a first bit value or a second bit value;

providing, to the storage controller from the non-volatile memory device, first word line read data indicating a first number of memory cells having the first bit value from among memory cells of a first word line of the target memory block based on the first request;

providing, to the storage controller from the non-volatile memory device, second word line read data indicating a second number of memory cells having the first bit value from among memory cells of a second word line of the target memory block based on the first request, the second word line being adjacent to the first word line;

calculating, by the storage controller, a first word line gap value based on the first word line read data and the second word line read data, wherein the first word line gap value indicates an absolute value of a difference between the first number and the second number; and performing, by the storage controller, a first reliability operation of the target memory block based on the first word line gap value, wherein the performing of the first reliability operation of the target memory block comprises:

determining, by the storage controller, whether the first word line gap value exceeds a first threshold value; and adjusting, by the storage controller, one or more read voltage levels based on the first word line gap value in response to determining that the first word line gap value exceeds the first threshold value, and wherein the adjusting of the one or more read voltage levels comprises adjusting, by the storage controller, one or more read voltage levels for memory cells of a third word line adjacent to the second word line based on the first word line gap value.

2. The method of claim 1, wherein the first request includes information about a target read voltage level, wherein the first number of memory cells is determined based on the target read voltage level, and wherein the second number of memory cells is determined based on the target read voltage level.

3. The method of claim 2, wherein the target read voltage level is used to distinguish an erase state from a first programming state.

4. The method of claim 1, wherein the word line sequential read operation includes sequentially performing a first read operation of the first word line and a second read operation of the second word line, and wherein a first distance from the first word line to a semiconductor substrate is greater than a second distance from the second word line to the semiconductor substrate.

5. The method of claim 1, wherein the performing of the first reliability operation of the target memory block further comprises:

determining, by the storage controller, whether the first word line gap value exceeds a second threshold value; and providing, by the storage controller, a second request indicating a read reclaim operation of the target memory block in response to determining that the first word line gap value exceeds the second threshold value.

6. The method of claim 5, wherein the second threshold value is greater than the first threshold value.

7. The method of claim 1, further comprising:

providing, to the storage controller from the non-volatile memory device, third word line read data corresponding to memory cells of the third word line of the target memory block based on the first request;

calculating, by the storage controller, a second word line gap value based on the second word line read data and the third word line read data; and performing, by the storage controller, a second reliability operation of the target memory block based on the second word line gap value.

8. The method of claim 7, wherein the word line sequential read operation includes sequentially performing a first read operation of the first word line, a second read operation of the second word line, and a third read operation of the third word line, wherein a first distance from the first word line to a semiconductor substrate is greater than a second distance from the second word line to the semiconductor substrate, and wherein the second distance is greater than a third distance from the third word line to the semiconductor substrate.

9. The method of claim 7, wherein the calculating of the first word line gap value includes storing, by the storage controller, the second word line read data such that the second word line read data comprises backed-up word line read data, and wherein the calculating of the second word line gap value includes using, by the storage controller, the backed-up word line read data as the second word line read data.

10. The method of claim 7, wherein the performing of the second reliability operation of the target memory block comprises:

determining, by the storage controller, whether the second word line gap value exceeds the first threshold value;

adjusting, by the storage controller, a read voltage level for memory cells of a fourth word line adjacent to the third word line based on the second word line gap value in response to determining that the second word line gap value exceeds the first threshold value;

determining, by the storage controller, whether the second word line gap value exceeds a second threshold value; and providing, by the storage controller, a second request indicating a read reclaim operation of the target memory block in response to determining that the second word line gap value exceeds the second threshold value, and wherein the second threshold value is greater than the first threshold value.

11. A method of operating a storage device which includes a storage controller and a non-volatile memory device, the method comprising:

providing, by the storage controller, a first request indicating a word line sequential read operation of a target memory block of the non-volatile memory device, wherein each memory cell of the target memory block has a first bit value or a second bit value determined based on a target read voltage level;

generating, by the non-volatile memory device, first word line read data in response to the first request by applying the target read voltage level to a first word line of the target memory block, the first word line read data indicating a first number of memory cells having the first bit value from among memory cells of the first word line;

generating, by the non-volatile memory device, second word line read data in response to the first request by applying the target read voltage level to a second word line of the target memory block adjacent to the first word line, the second word line read data indicating a second number of memory cells having the first bit value from among memory cells of the second word line;

calculating, by the non-volatile memory device, a difference between the first number of memory cells of the first word line and the second number of memory cells of the second word line;

determining, by the non-volatile memory device, a word line gap value between the first and second word lines based on an absolute value of the difference between the first number of memory cells of the first word line and the second number of memory cells of the second word line; and performing, by the non-volatile memory device, a reliability operation of the target memory block based on the word line gap value, wherein the performing of the reliability operation of the target memory block comprises:

determining, by the non-volatile memory device, whether the word line gap value exceeds a threshold value; and generating, by the non-volatile memory device, read reclaim determination data indicating a read reclaim operation of the target memory block in response to determining that the word line gap value exceeds the threshold value.

12. The method of claim 11, wherein the threshold value is a second threshold value, wherein the performing of the reliability operation of the target memory block further comprises:

determining, by the non-volatile memory device, whether the word line gap value exceeds a first threshold value; and adjusting, by the non-volatile memory device, one or more read voltage levels for memory cells of a third word line adjacent to the second word line based on the word line gap value in response to determining that the word line gap value exceeds the first threshold value.

13. The method of claim 11, wherein the method of operating the storage device further comprises:

providing, to the storage controller from the non-volatile memory device, the read reclaim determination data; and providing, by the storage controller, a second request indicating the read reclaim operation of the target memory block based on the read reclaim determination data.

14. A storage device comprising:

a non-volatile memory device that includes a target memory block having a plurality of word lines, wherein each memory cell of the target memory block has a first bit value or a second bit value determined based on a target read voltage level; and a storage controller configured to generate a first request that indicates a word line sequential read operation of the target memory block, wherein, in response to the first request, the non-volatile memory device is configured to generate first word line read data by applying the target read voltage level to a first word line of the plurality of word lines, and to generate second word line read data by applying the target read voltage level to a second word line, adjacent to the first word line, of the plurality of word lines, the first word line read data indicating a first number of memory cells having the first bit value from among memory cells of the first word line, and the second word line read data indicating a second number of memory cells having the first bit value from among memory cells of the second word line, wherein the non-volatile memory device or the storage controller is configured to:

calculate a difference between the first number of memory cells of the first word line and the second number of memory cells of the second word line;

determine a word line gap value between the first and second word lines based on an absolute value of the difference between the first number of memory cells of the first word line and the second number of memory cells of the second word line; and perform a reliability operation of the target memory block based on the word line gap value, and wherein the storage controller is configured to:

determine whether the word line gap value exceeds a threshold value; and generate a second request that indicates a read reclaim operation of the target memory block in response to determining that the word line gap value exceeds the threshold value.

15. The storage device of claim 14, wherein the threshold value is a second threshold value, wherein the non-volatile memory device is further configured to provide the first word line read data and the second word line read data to the storage controller, wherein the storage controller comprises:

a command manager configured to generate the first request;

a word line distribution calculator configured to calculate the word line gap value and to perform the reliability operation; and a history table configured to manage read voltage levels of the plurality of word lines of the target memory block, and wherein the word line distribution calculator is configured to:

determine whether the word line gap value exceeds a first threshold value;

adjust one or more of the read voltage levels of the history table in response to determining that the word line gap value exceeds the first threshold value;

determine whether the word line gap value exceeds the second threshold value; and generate the second request through the command manager indicating the read reclaim operation of the target memory block in response to determining that the word line gap value exceeds the second threshold value.

16. The storage device of claim 14, wherein the threshold value is a second threshold value, wherein the non-volatile memory device further includes control logic, the control logic comprising:

a word line distribution calculator configured to calculate the word line gap value and to perform the reliability operation;

a word line read data buffer configured to store the first word line read data and the second word line read data; and a read voltage level adjuster configured to manage read voltage levels of the plurality of word lines of the target memory block, and wherein the word line distribution calculator is configured to:

determine whether the word line gap value exceeds a first threshold value; and adjust one or more of the read voltage levels through the read voltage level adjuster in response to determining that the word line gap value exceeds the first threshold value.

17. The storage device of claim 14, wherein the non-volatile memory device further includes control logic, the control logic comprising:

a word line distribution calculator configured to calculate the word line gap value and to perform the reliability operation;

a word line read data buffer configured to store the first word line read data and the second word line read data; and a read voltage level adjuster configured to manage read voltage levels of the plurality of word lines of the target memory block.

* * * * *